(12) United States Patent
Shin et al.

(10) Patent No.: US 8,941,793 B2
(45) Date of Patent: Jan. 27, 2015

(54) LIQUID CRYSTAL DISPLAY TO INCREASE SIDE VIEW VISIBILITY

(75) Inventors: Kyoung Ju Shin, Hwaseong-si (KR); Hak Sun Chang, Yongin-si (KR); Yong Hwan Shin, Yongin-si (KR)

(73) Assignee: Samsung Display Co., Ltd., Yongin (KR)

( * ) Notice: Subject to any disclaimer, the term of this patent is extended or adjusted under 35 U.S.C. 154(b) by 431 days.

(21) Appl. No.: 13/170,578

(22) Filed: Jun. 28, 2011

(65) Prior Publication Data

US 2012/0147282 A1  Jun. 14, 2012

(30) Foreign Application Priority Data

Dec. 14, 2010  (KR) ........................ 10-2010-0127627

(51) Int. Cl.
| | |
|---|---|
| G02F 1/1368 | (2006.01) |
| G02F 1/1362 | (2006.01) |
| G02F 1/1337 | (2006.01) |
| G02F 1/1343 | (2006.01) |
| G02F 1/1333 | (2006.01) |

(52) U.S. Cl.
CPC ...... *G02F 1/13624* (2013.01); *G02F 1/133707* (2013.01); *G02F 2001/134345* (2013.01); *G02F 2201/40* (2013.01); *G02F 1/133371* (2013.01); *G02F 1/133753* (2013.01)
USPC .............................................. 349/48; 349/39

(58) Field of Classification Search
None
See application file for complete search history.

(56) References Cited

U.S. PATENT DOCUMENTS

| | | | | |
|---|---|---|---|---|
| 4,840,460 | A | * | 6/1989 | Bernot et al. ................. 349/144 |
| 5,126,865 | A | * | 6/1992 | Sarma ............................. 349/85 |
| 2003/0095223 | A1 | | 5/2003 | Song |
| 2005/0036091 | A1 | * | 2/2005 | Song ............................. 349/129 |
| 2006/0023137 | A1 | | 2/2006 | Kamada et al. |
| 2006/0125970 | A1 | * | 6/2006 | Inoue et al. ..................... 349/38 |
| 2007/0058123 | A1 | * | 3/2007 | Um et al. ....................... 349/144 |
| 2007/0064164 | A1 | | 3/2007 | Tasaka et al. |
| 2008/0018844 | A1 | * | 1/2008 | Song ............................. 349/139 |
| 2008/0238817 | A1 | * | 10/2008 | Mamba et al. .................. 345/55 |
| 2008/0273131 | A1 | | 11/2008 | Kim |
| 2008/0284931 | A1 | | 11/2008 | Kimura |

(Continued)

FOREIGN PATENT DOCUMENTS

| | | |
|---|---|---|
| KR | 1020090011586 | 2/2009 |
| KR | 1020100101978 | 9/2010 |

OTHER PUBLICATIONS

European Search Report of EP Patent Application No. 11 17 4814 dated on Jan. 20, 2012.

(Continued)

*Primary Examiner* — Mike Stahl
(74) *Attorney, Agent, or Firm* — H.C. Park & Associates, PLC

(57) ABSTRACT

Provided is a liquid crystal display to provide improved transmittance and visibility includes a first substrate; a first switching element and a second switching element formed on the first substrate configured to be switched by the same signal; a first subpixel electrode connected to the first switching element; a second subpixel electrode connected to the second switching element; a third switching element connected to the second switching element; a third subpixel electrode connected to the third switching element; a second substrate; a common electrode formed on the second substrate; and a liquid crystal layer formed between the first substrate and the second substrate.

40 Claims, 14 Drawing Sheets

(56) References Cited

U.S. PATENT DOCUMENTS

2009/0002586 A1  1/2009  Kimura
2009/0153759 A1* 6/2009  Um et al. .................... 349/39
2010/0123842 A1* 5/2010  Lee et al. .................... 349/39
2010/0253869 A1  10/2010 Ting et al.

OTHER PUBLICATIONS

European Search Report dated Jul. 4, 2014 for EP Patent Application No. 14162266.21—1904.

* cited by examiner

LIQUID CRYSTAL DISPLAY TO INCREASE SIDE VIEW VISIBILITY

CROSS-REFERENCE TO RELATED APPLICATION

This application claims priority to and the benefit of Korean Patent Application No. 10-2010-0127627, filed on Dec. 14, 2010, which is incorporated by reference for all purposes as if fully set forth herein.

BACKGROUND

1. Field

The present invention relates to a liquid crystal display, and more particularly, to a liquid crystal display that has improved transmittance and visibility.

2. Discussion of the Background

Liquid crystal displays (LCD), may be composed of two display panels with field generating electrodes, such as a pixel electrode and a common electrode, and a liquid crystal layer between the display panels. LCDs display images by generating an electric field in the liquid crystal layer if voltage is applied to the field generating electrodes such that the liquid crystal molecules in the liquid crystal layer are aligned to control polarization of incident light.

The conventional liquid crystal displays may include switching elements connected to the pixel electrodes and multiple signal lines, such as gate lines and data lines, to apply voltage to the pixel electrodes by controlling the switching elements.

Further, in the conventional liquid crystal displays, a vertically aligned mode of liquid crystal display, in which the long axes of the liquid crystal molecules are arranged perpendicular to the display panel, without an electric field has been under the spotlight because of the large contrast ratio and the wide reference viewing angle. The reference viewing angle may imply a viewing angle under a contrast ratio of 1:10 or a luminance reverse limit angle between grays.

A method of dividing one pixel into two subpixels and applying different voltages to the subpixels to provide a difference in transmittance has been proposed in order to make the side visibility similar to the front visibility of the type of liquid crystal display. In this configuration, if different voltages are applied to the two subpixels through different data lines, double data driving circuits may be used. However, such a configuration may face cost increases in manufacturing.

A method of connecting the same data line to the two subpixels and reducing the voltage of one of the two subpixels by using a specific switching element and a capacitor has been proposed to solve the problem. However, the method has a problem of low transmittance to the same aperture ratio.

The above information disclosed in this Background section is only for enhancement of understanding of the background of the invention and therefore it may contain information that may not constitute prior art that may be already known in this country to a person of ordinary skill in the art.

SUMMARY

The present invention has been made in an effort to provide a liquid crystal display having advantages of having high transmittance and improved visibility.

Additional features of the invention will be set forth in the description which follows, and in part will be apparent from the description, or may be learned by practice of the invention.

Exemplary embodiments of the present invention provide a liquid crystal display including a first substrate; a first switching element and a second switching element formed on the first substrate and configured to be switched by the same signal; a first subpixel electrode connected to the first switching element; a second subpixel electrode connected to the second switching element; a third switching element connected to the second switching element; a third subpixel electrode connected to the third switching element; a second substrate; a common electrode formed on the second substrate; and a liquid crystal layer formed between the first substrate and the second substrate.

Exemplary embodiment of the present invention provides a liquid crystal display including a first substrate; a first gate line, a second gate line, and a data line formed on the first substrate; a first switching element and a second switching element connected to the first gate line and the data line; a first subpixel electrode connected to the first switching element; a second subpixel electrode and a third subpixel electrode connected to the second switching element; a first transforming capacitor formed between the second switching element and the third subpixel electrode; a third switching element connected to the second switching element and configured to be switched by second gate line; a second transforming capacitor connected to the third switching element; a second substrate; a common electrode formed on the second substrate; and a liquid crystal layer formed between the first substrate and the second substrate.

Exemplary embodiment of the present invention provide a liquid crystal display including a first substrate; a first switching element and a second switching element formed on the first substrate; a first liquid crystal capacitor connected to the first switching element; a second liquid crystal capacitor connected to the second switching element; a third switching element connected to the second switching element; and a third liquid crystal capacitor connected to the third switching element.

Exemplary embodiment of the present invention provide a liquid crystal display including a first substrate; a first gate line, a second gate line, and a data line formed on the first substrate; a first switching element and a second switching element connected to the first gate line and the data line; a first liquid crystal capacitor connected to the first switching element; a second liquid crystal capacitor and a third liquid crystal capacitor connected to the second switching element; a first transforming capacitor formed between the second switching element and the third liquid crystal capacitor; a third switching element connected to the second switching element and configured to be switched by the second gate line; and a second transforming capacitor connected to the third switching element.

It is to be understood that both foregoing general descriptions and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
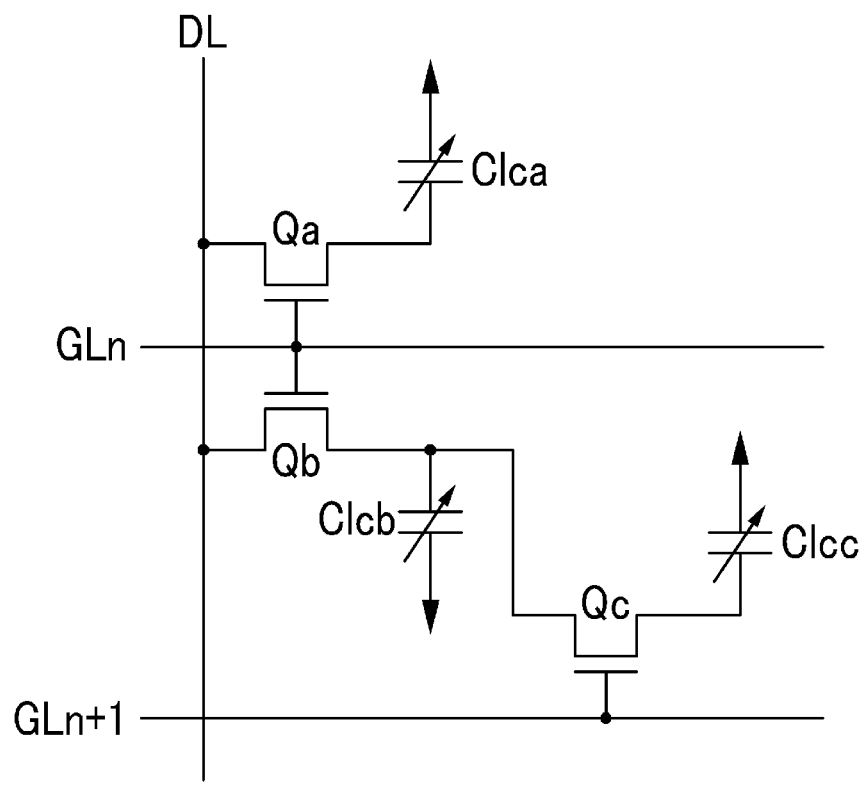
FIG. 1 is an equivalent circuit diagram of one pixel a liquid crystal display according to an exemplary embodiment of the invention.

The present invention will be described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that when an element is referred to as being "on" or "connected to" or "coupled to" another element, it can be directly on, directly connected to, or directly coupled to the other element, or intervening elements may be present. In contrast, if an element is referred to as being "directly on" or "directly connected to" or "directly coupled to" another element, no intervening elements are present. Throughout the drawings and the detailed description, unless otherwise described, the same drawing reference numerals are understood to refer to the same elements, features, and structures. The relative size and depiction of these elements may be exaggerated for clarity, illustration, and convenience.

A liquid crystal display according to a first exemplary embodiment of the present invention is described first with reference to the accompanying drawings.

Figure 2:
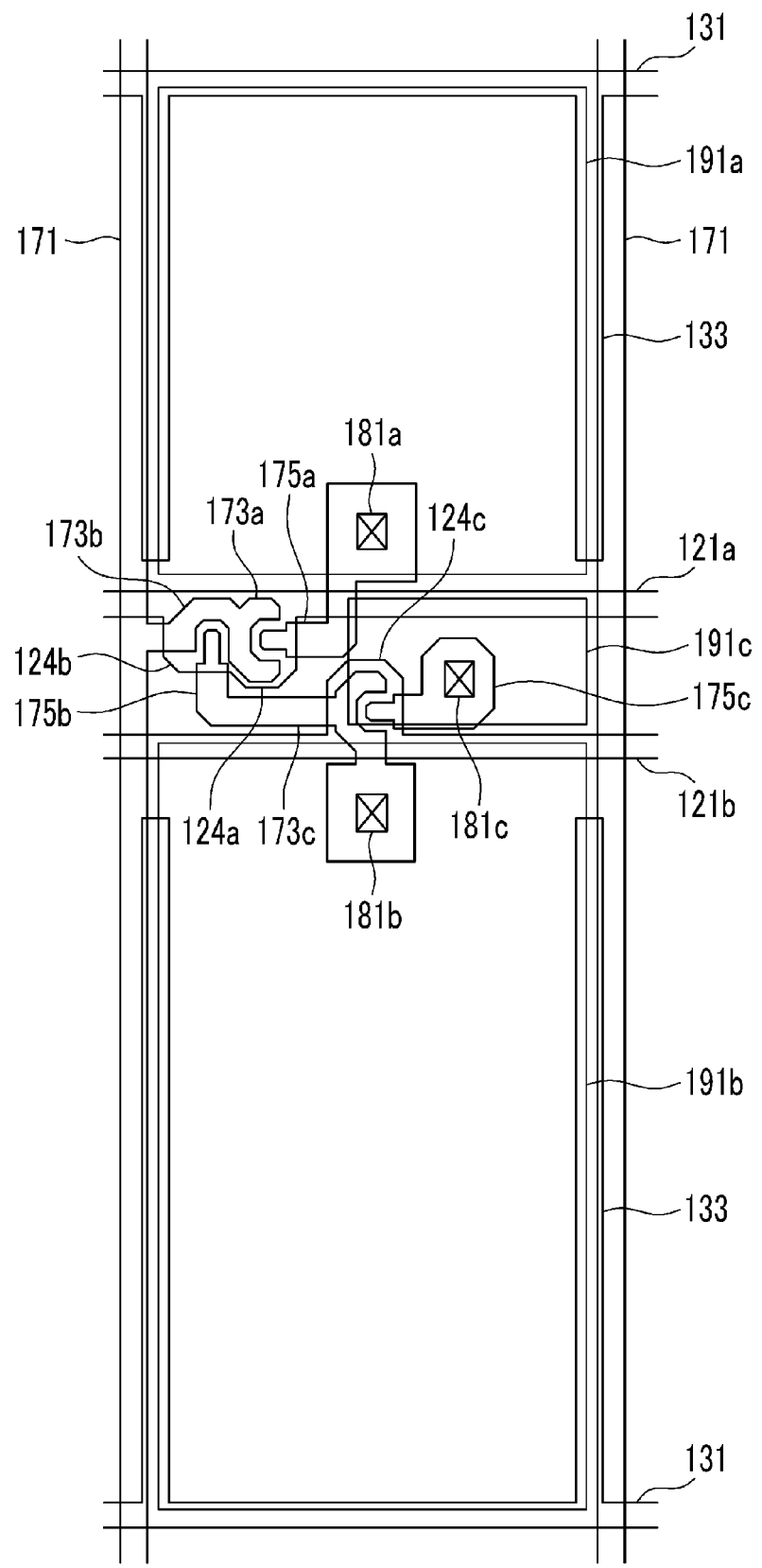
FIG. 2 is a layout view of a lower display panel of the liquid crystal display according to an exemplary embodiment of the invention.

FIG. 1 is an equivalent circuit diagram of one pixel a liquid crystal display according to an exemplary embodiment of the invention. FIG. 2 is a layout view of a lower display panel of the liquid crystal display according to an exemplary embodiment of the invention.

A liquid crystal display according to a first exemplary embodiment of the invention, as shown in FIG. 1, includes a first switching element Qa and a second switching is element Qb, a first liquid crystal capacitor Clca connected to the first switching element Qa, a second liquid crystal capacitor Clcb connected to the second switching element Qb, a third switching element Qc connected to the second switching element Qb, and a third liquid crystal capacitor Clcc connected to the third switching element Qc.

The liquid crystal display according to the first exemplary embodiment of the invention may further include a first gate line GLn, a second gate line GLn+1, and a data line DL. The first switching element Qa and the second switching element Qb may be three terminal elements of a thin film transistor etc., connected to the first gate line GLn to be switched by the same signal, and connected to the data line DL to receive the same data signal. The third switching element Qc is a three terminal element of a thin film transistor etc., and is connected to the second gate line GLn+1.

If gate-on voltage is applied to the first gate line GLn, the first switching element Qa and the second switching element Qb are turned on and the same data signal is applied through the data line DL, such that the first liquid crystal capacitor Clca and the second liquid crystal capacitor Clcb are charged with similar or near identical voltage. Thereafter, if gate-on voltage is applied to the second gate line GLn+1, which is the next gate line, the third switching element Qc is turned on and some of the charged voltage of the second liquid crystal capacitor Clcb are discharged to the third liquid crystal capacitor Clcc. Therefore, a difference in voltage is created between the first liquid crystal capacitor Clca and the second liquid crystal capacitor Clcb. As a result, the side visibility of the liquid crystal display can be improved.

In the structure of the liquid crystal display according to the first exemplary embodiment of the invention, as shown in FIG. 2, one or more of first gate lines 121a and second gate lines 121b are provided on a first substrate (not shown). In an example, the first substrate may be made of transparent glass or plastic.

The first gate lines 121a and second gate lines 121b may transmit gate signals and may extend transversely. The first gate lines 121a and the second gate lines 121b may be alternately disposed and gate-on voltage may be sequentially applied to the first gate lines 121a and the second gate lines 121b.

The first gate line 121a includes one or more of first gate electrodes 124a and second gate electrodes 124b, which protrude downward. The first gate electrode 124a and the second gate electrode 124b may be connected in one unit, such that they receive the same gate signal through the first gate line 121a. The second gate line 121b includes one or more of third gate electrodes 124c protruding upward.

A gate insulating layer (not shown) may be formed on the first gate lines 121a and second gate lines 121b. A semiconductor island (not shown) may be formed on the gate insulating layer. The semiconductor island may be disposed above the first gate electrode 124a, second gate electrode 124b, and third gate electrode 124c.

As shown further in FIG. 2, one or more data lines 171, a first source electrode 173a, a second source electrode 173b, a third source electrode 173c, a first drain electrode 175a, a second drain electrode 175b, and a third drain electrode 175c are formed on the semiconductor and the gate insulating layer.

The data line 171 transmits a data signal and may extend longitudinally to cross the first gate line 121a and second gate line 121b.

The first source electrode 173a and the second source electrode 173b protrude from the data line 171 and may be connected in one unit, such that they receive the similar or near identical data voltage through the data line 171. The first source electrode 173a is formed in a U-shape on the first gate electrode 124a and the second source electrode 173b is formed in a U-shaped on the second gate electrode 124b.

The first drain electrode 175a is spaced apart from the first source electrode 173a and has a bar-shaped end, with the first gate electrode 124a there between, in which the bar-shaped end is partially surrounded by the first source electrode 173a bending in a U-shape.

The second drain electrode 175b is spaced apart from the second source electrode 173b and has a bar-shaped end, with the second gate electrode 124b there between, in which the bar-shaped end is partially surrounded by the second source electrode 173b bending in a U-shape. The other end of the second drain electrode 175b is connected to the third source electrode 173c.

The third source electrode 173c extends from the second drain electrode 175b, in a U-shape on the third gate electrode 124c. The third drain electrode 175c is spaced apart from the third source electrode 173c and has a bar-shaped end, with the third gate electrode 124c there between, in which the bar-shaped end is partially surrounded by the third source electrode 173c bending in a U-shape.

The first source electrode 173a may be formed in an inverse U-shape, the second source electrode 173b in a U-shape open to the right, and the third source electrode 173c in a U-shape open to the right. Therefore, it may be possible to reduce a change in capacitance between the gate electrodes (first gate electrode 124a, second gate electrode 124b, and third gate electrode 124c) and the source electrodes (first source electrode 173a, second source electrode 173b, and third source electrode 173c), even if an error occurs in the positions of the source electrodes (first electrode 173a, second electrode 173b, and third source electrode 173c) due to a process deviation.

In an example, the first gate electrode 124a, the first source electrode 173a, and the first drain electrode 175a may constitute the first switching element (Qa in FIG. 1). The second gate electrode 124b, the second source electrode 173b, and the second drain electrode 175b may constitute the second switching element (Qb in FIG. 1). The third gate electrode 124c, the third source electrode 173c, the third drain electrode 175c may constitute the third switching element (Qc in FIG. 1).

A passivation layer (not shown) is formed on the data line 171, the first source electrode 173a, second source electrode 173b, and third source electrode 173c, first drain electrode 175a, second drain electrode 175b, and third drain electrode 175c. The passivation layer may be made of an inorganic insulator or organic insulator, with a flat surface. Further, the passivation layer may have a double layer structure including a lower layer, which may be an inorganic layer, and an upper layer, which may be an organic layer, in order to keep the high insulation of an organic layer, without damaging the exposed portion of the semiconductor.

A first contact hole 181a exposing a portion of the first drain electrode 175a, a second contact hole 181b exposing a portion of the second drain electrode 175b, and a third contact hole 181c exposing a portion of the third drain electrode 175c are formed on the passivation layer.

One or more first subpixel electrodes 191a, second subpixel electrodes 191b, and third subpixel electrodes 191c may be made of a transparent electrode material, such as an ITO (Indium Tin Oxide) or an IZO (Indium Zinc Oxide) on the passivation layer. The first subpixel electrode 191a is connected to the first drain electrode 175a through the first contact hole 181a, the second subpixel electrode 191b is connected to the second drain electrode 175b through the second contact hole 181b, and the third subpixel electrode 191c is connected to the third drain electrode 175c through the third contact hole 181c.

Although not shown, a common electrode may be provided on a second substrate assembled with the first substrate, and a liquid crystal layer may be provided between the first substrate and the second substrate.

The first subpixel electrode 191a and the second subpixel electrode 191b together with the common electrode on the second substrate and the liquid crystal layer there between respectively constitute first liquid crystal capacitors (Clca in FIG. 1) and second liquid crystal capacitor (Clcb in FIG. 1). The liquid crystal capacitors as described here may retain the applied voltage even after the first and second switching elements Qa and Qb are turned off.

The third subpixel electrode 191c constitutes a third liquid crystal capacitor (Clcc in FIG. 1), together with the common electrode on the second substrate and the liquid crystal layer there between. Some of the voltage stored in the second liquid crystal capacitor Clcb may be discharged to the third liquid crystal capacitor Clcc, such that a difference in voltage may be created between the first liquid crystal capacitor Clca and the second liquid crystal capacitor Clcb.

In this configuration, the third subpixel electrode 191c is formed between the first gate line 121a and the second gate line 121b. A light blocking member is formed on the second substrate, corresponding to the first gate line 121a, second gate line 121b, first switching element Qa, second switching element Qb, and third switching element Qc, and the third subpixel electrode 191c. That is, the third subpixel electrode 191c may reduce the voltage of the second subpixel electrode 191b, but may not display an image by transmitting light.

The liquid crystal display according to the first exemplary embodiment of the invention may further include one or more of storage electrode lines 131 formed on the same layer as the first gate line 121a and second gate line 121b.

The storage electrode line 131 receives a reference voltage and may extend substantially in parallel with and at a reference distance from the first gate line 121a and second gate line 121b. The storage electrode line 131 may be positioned between the first gate line 121a of a first pixel and the second gate line 121b of a second pixel. The storage electrode line 131 may include a storage electrode 133, which may expand upward or downward. However, the shape and arrangement of the storage electrode line 131 and the storage electrodes 133 may be modified in various ways.

In the conventional technology, the third drain electrode 175c and the storage electrode 133 may be configured overlap to function as a capacitor that reduces the voltage of the second subpixel electrode 191b. However, this type of configuration may incur some problem in that the provided transmittance may be low, and the semiconductor is positioned between the third drain electrode 175c and the storage electrode 133 to possibly generate a surface residual image, if the liquid crystal display is formed through a four-time photolithography. Further, there may be a problem in that the first gate line 121a and the third drain electrode 175c overlap, which may possibly generate parasitic capacity, which may have an adverse effect on the image made by the second subpixel electrode 191b.

On the contrary, in the disclosed invention, the third subpixel electrode 191c may be formed such that the third liquid crystal capacitor (Clcc in FIG. 1) functions as a capacitor to reduce the voltage of the second subpixel electrode 191b. Accordingly, it may be possible to further improve the transmittance and reduce the surface residual image, in comparison to the related art. In an example, the transmittance may improve as much as 5%, if not more. Further, the first gate line 121a and the third drain electrode 175c may be configured so that do not overlap each other. As a result, it may be possible to prevent or reduce parasitic capacitance.

The first subpixel electrode 191a and second subpixel electrode 191b constitute a storage capacitor by overlapping the storage electrode 133, which may help the first liquid crystal capacitor Clca and second liquid crystal capacitor Clcb retain their voltage.

The voltage relationship that may be present if the liquid crystal display of the first exemplary embodiment of the invention is activated is described hereafter.

Figure 3:
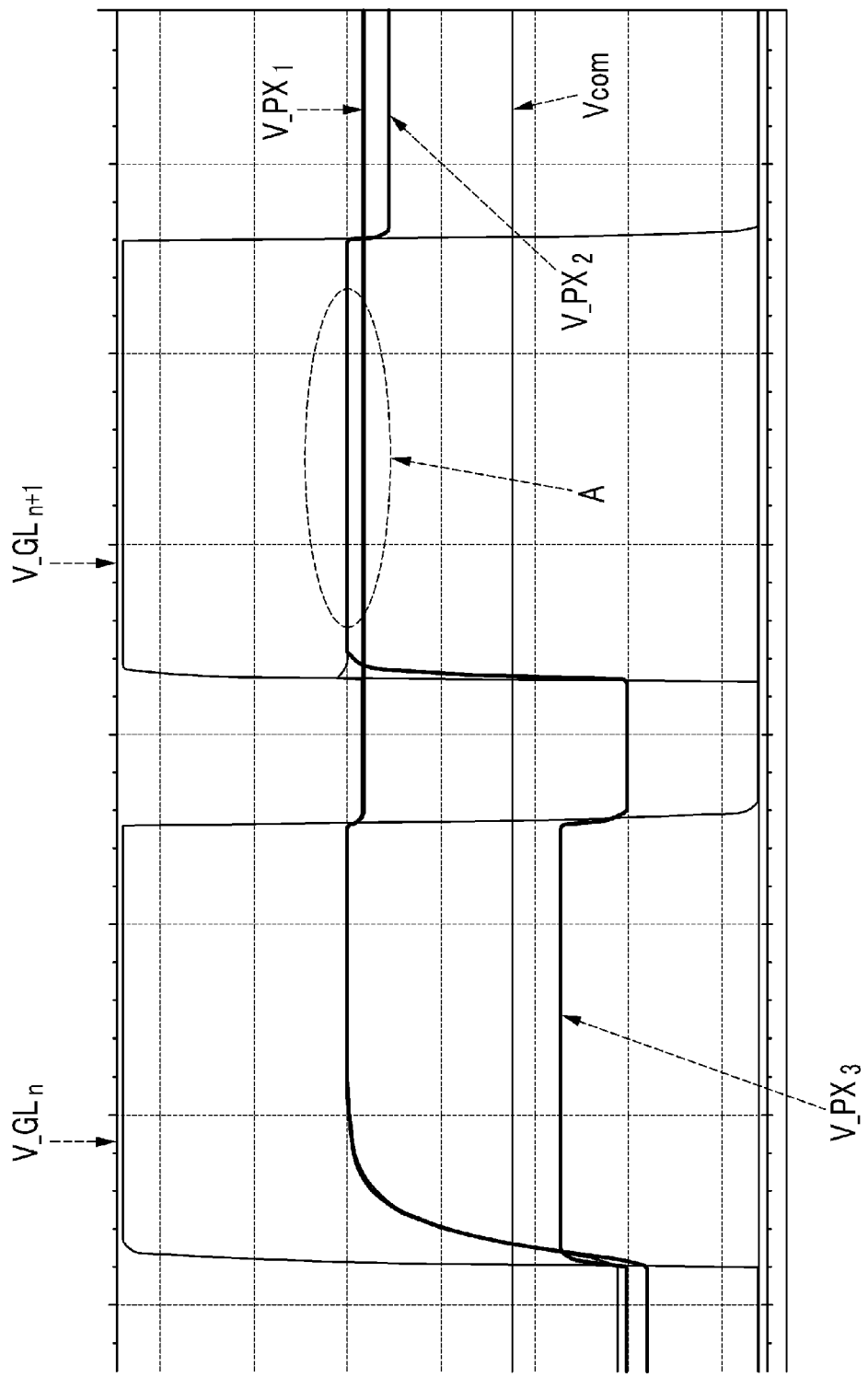
FIG. 3 is a graph showing voltage of each electrode if the liquid crystal display is activated according to an exemplary embodiment of the invention.

FIG. 3 is a graph showing voltage of each electrode if the liquid crystal display is activated according to an exemplary embodiment of the invention.

First, if a first gate signal V_GLn is supplied to the first gate line 121a, the voltage V_PX1 of the first subpixel electrode 191a and the voltage V_PX2 of the second subpixel electrode 191b may be charged to similar or near identical levels. If a second gate signal V_GLn+1 is supplied to the second gate line 121b, the voltage V_PX3 of the third subpixel electrode 191c may be increased to similar voltage level V_PX2 of the second subpixel electrode 191b, and the voltage V_PX2 of the second subpixel electrode 191b and the voltage V_PX3 of the third subpixel electrode 191c may be decreased to a voltage level below the voltage V_PX1 of the first subpixel electrode 191a.

It can be seen that the voltage V_PX2 of the second subpixel electrode 191b and the voltage V_PX3 of the third subpixel electrode 191c are close at the point A, such that it can also be seen that the third subpixel electrode 191c may reduce the voltage V_PX2 of the second subpixel electrode 191b, and also display an image. Using the third subpixel electrode 191c to display an image, without covering it with a light blocking member, in the second exemplary embodiment is described hereafter.

Figure 4:
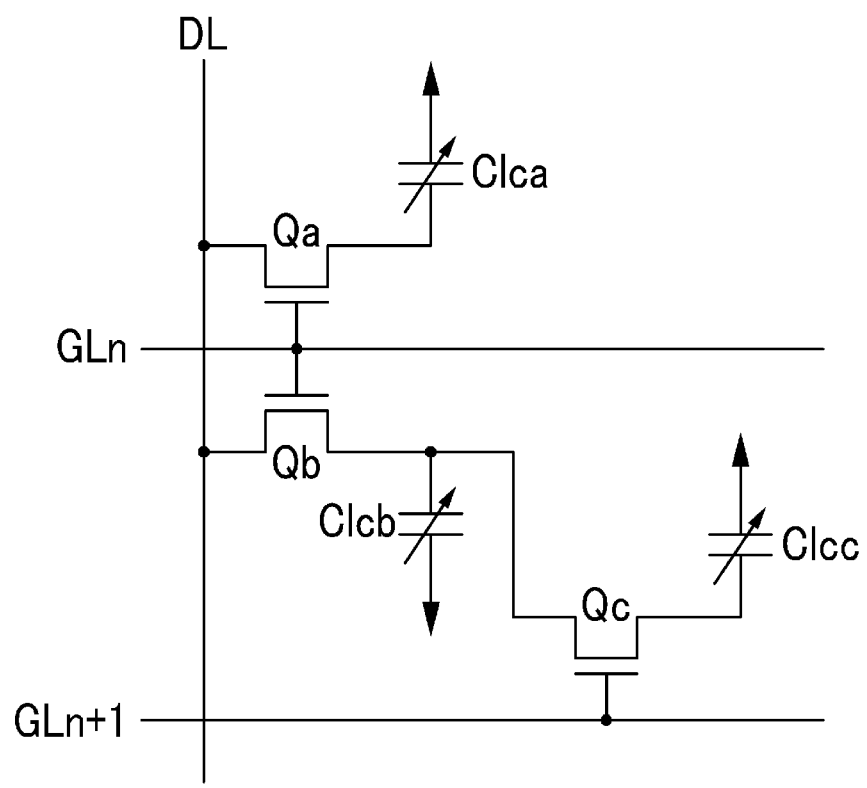
FIG. 4 is an equivalent circuit diagram of one pixel of a liquid crystal display according to an exemplary embodiment of the invention.
Figure 5:
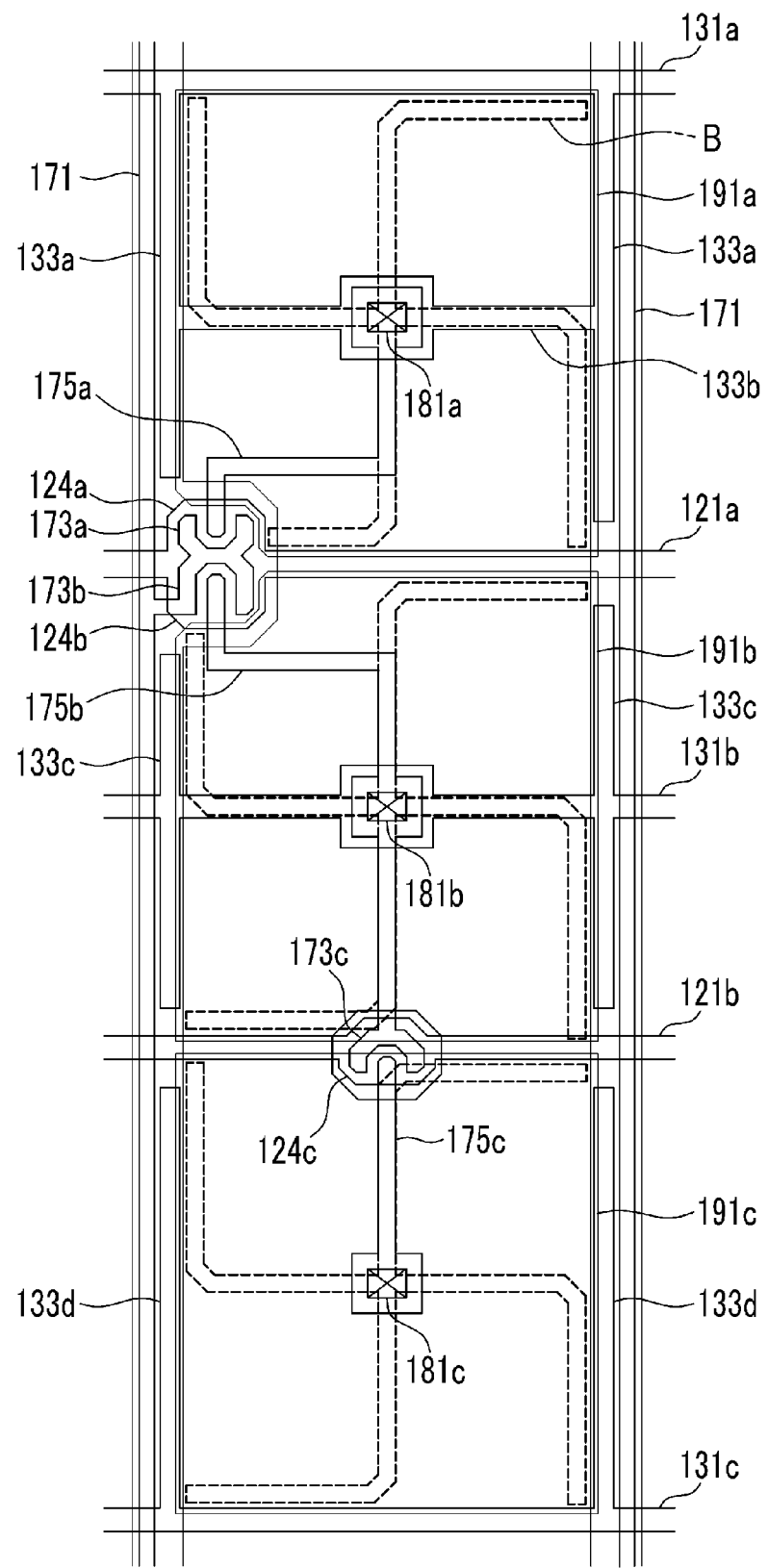
FIG. 5 is a layout view of a lower display panel of the liquid crystal display according to an exemplary embodiment of the invention.

A liquid crystal display according to the second exemplary embodiment of the invention is described hereafter in detail with reference to FIG. 4 and FIG. 5.

FIG. 4 is an equivalent circuit diagram of one pixel of a liquid crystal display according to an exemplary embodiment of the invention. FIG. 5 is a layout view of a lower display panel of the liquid crystal display according to an exemplary embodiment of the invention.

As shown in FIG. 4, the liquid crystal display according to the second exemplary embodiment of the invention may be similar in structure as illustrated in the circuit diagram as the liquid crystal display according to the first exemplary embodiment, and as such will not described. However, the second exemplary embodiment has a difference in the layout view from the first exemplary embodiment, and this is described in more detail with reference to FIG. 5.

In the structure of the liquid crystal display according to the second exemplary embodiment of the invention, one or more of first gate lines 121a and second gate lines 121b are formed on a first substrate (not shown), which may made of transparent glass or plastic, as shown in FIG. 5.

The first gate line 121a and the second gate line 121b transmit gate signals and may extend transversely. The first gate line 121a and the second gate line 121b may be alternately disposed and gate-on voltage may be sequentially applied to the first gate line 121a and the second gate line 121b.

The first gate line 121a may include one or more first gate electrodes 124a and second gate electrodes 124b, which may protrude upward and downward, respectively. Also, the first gate electrode 124a and the second gate electrode 124b may receive the same gate signal through the first gate line 121a. The second gate line 121b may include one or more third gate electrodes 124c, which may protrude therefrom.

A gate insulating layer (not shown) may be further formed on the first gate lines 121a and the second gate lines 121b. A semiconductor island (not shown) may be formed on the gate insulating layer. The semiconductor island may further be disposed above the first gate electrode 124a, the second gate electrode 124b, and the third gate electrode 124c.

One or more data lines 171, a first source electrode 173a, a second source electrode 173b, a third source electrode 173c, a first drain electrode 175a, a second drain electrode 175b, and a third drain electrode 175c may be formed on the semiconductor and the gate insulating layer.

The data line 171 transmits a data signal and may extend longitudinally, crossing the first gate line 121a and the second gate line 121b.

The first source electrode 173a protrudes above the first gate electrode 124a from the data line 171, the second source electrode 173b protrudes above the second gate electrode 124b from the data line 171. Further, the first source electrode 173a and the second source electrode 173b may be connected in one unit, such that they may receive the same data voltage through the data line 171. The first source electrode 173a is formed in a U-shape on the first gate electrode 124a and the second source electrode 173b is formed in a U-shape on the second gate electrode 124b.

The first drain electrode 175a is spaced apart from the first source electrode 173a and has a bar-shaped end, with the first gate electrode 124a there between, in which the bar-shaped end is partially surrounded by the first source electrode 173a bending in a U-shape.

The second drain electrode 175b is spaced apart from the second source electrode 173b and has a bar-shaped end, with the second gate electrode 124b there between, in which the bar-shaped end is partially surrounded by the second source electrode 173b bending in a U -shape. The other end of the second drain electrode 175b is connected to the third source electrode 173c.

The third source electrode 173c extends from the second drain electrode 175b, in U-shape on the third gate electrode 124c. The third drain electrode 175c is spaced apart from the third source electrode 173c and has a bar-shaped end, with the third gate electrode 124c there between, in which the bar-shaped end is partially surrounded by the third source electrode 173c bending in a U-shape.

In an example, the first gate electrode 124a, the first source electrode 173a, and the first drain electrode 175a may constitute the first switching element (Qa in FIG. 4). The second gate electrode 124b, the second source electrode 173b, and the second drain electrode 175b may constitute the second switching element (Qb in FIG. 4). The third gate electrode 124c, the third source electrode 173c, the third drain electrode 175c may constitute the third switching element (Qc in FIG. 4).

A passivation layer (not shown) may be formed on various components, including the data line 171, the first source electrode 173a, the second source electrode 173b, and the third source electrode 173c, the first drain electrode 175a, the second drain electrode 175b, and the third drain electrode 175c. The passivation layer may be made of an inorganic insulator or an organic insulator, with a flat surface. Further, the passivation layer may have a double layer structure composed of a lower layer, which may be an inorganic layer, and an upper layer, which may be an organic layer, in order to keep the high insulation of an organic layer and reducing the risk of damaging the exposed portion of the semiconductor.

A first contact hole 181a exposing a portion of the first drain electrode 175a, a second contact hole 181b exposing a portion of the second drain electrode 175b, and a third contact hole 181c exposing a portion of the third drain electrode 175c may be formed on the passivation layer.

One or more first subpixel electrode 191a, second subpixel electrodes 191b, and third subpixel electrodes 191c may be made of a transparent electrode material, such as an ITO (Indium Tin Oxide) or an IZO (Indium Zinc Oxide), and formed on the passivation layer. The first subpixel electrode 191a is connected to the first drain electrode 175a through the first contact hole 181a. The second subpixel electrode 191b is connected to the second drain electrode 175b through the second contact hole 181b. The third subpixel electrode 191c is connected to the third drain electrode 175 through the third contact hole 181c.

The first subpixel electrode 191a and the second subpixel electrode 191b are formed above and under the first gate line 121a, respectively. Further, the second subpixel electrode 191b and the third subpixel electrode 191c are formed above and under the second gate line 121b, respectively. That is, the second subpixel electrode 191b is formed between the first gate line 121a and the second gate line 121b. In this configuration, although the first subpixel electrode 191a, the second subpixel electrode 191b, the third subpixel electrode 191c are shown having the same size, the invention is not limited thereto and may make the size different.

Although not shown, a common electrode may be provided on a second substrate. Further, the second substrate may be assembled with the first substrate and a liquid crystal layer may be formed between the first substrate and the second substrate.

The first subpixel electrode 191a and the second subpixel electrode 191b, together with the common electrode on the second substrate and the liquid crystal layer there between, may constitute first liquid crystal capacitors (Clca in FIG. 4) and second liquid crystal capacitor (Clcb in FIG. 4). The liquid crystal capacitors as described here may retain the applied voltage even after the first and second switching elements Qa and Qb are turned off.

The third subpixel electrode 191c together with the common electrode on the second substrate and the liquid crystal layer there between, may constitute a third liquid crystal capacitor (Clcc in FIG. 4). Some of the voltage stored in the second liquid crystal capacitor Clcb may be discharged to the third liquid crystal capacitor Clcc, such that a difference in voltage may be created between the first liquid crystal capacitor Clca and the second liquid crystal capacitor Clcb. As a result, the voltage level of the second subpixel electrode 191b and the voltage level of the third subpixel electrode 191c may be similar.

The liquid crystal display according to the second exemplary embodiment of the invention may further include one or more first electrode line 131a, second electrode line 131b, and third storage electrode line 131c that are formed on the same layer as the first gate line 121a and the second gate line 121b.

The first storage electrode line 131a, the second electrode line 131b, and the third storage electrode line 131c may receive reference voltage and may extend substantially in parallel with and at a reference distance from the first gate lines 121a and the second gate line 121b. The storage electrode lines (first storage electrode line 131a, the second storage electrode line 131b, and the third storage electrode line 131c) may further include additional storage electrodes (first storage electrode 133a, second storage electrode 133b, third storage electrode 133c, and fourth storage electrode 133d,) which expand therefrom.

In an example, the first storage electrode line 131a may be formed above the first subpixel electrode 191a, the second storage electrode line 131b may overlap the center portion of the second subpixel electrode 191b, and the third storage electrode line 131c may be formed under the third subpixel electrode 191c.

The first storage electrode 133a protrudes from the first storage electrode line 131a to partially overlap the left side and right side of the first subpixel electrode 191a.

The second storage electrode 133b may be formed in parallel with the first gate line 121a, overlapping the center portion of the first subpixel electrode 191a. The second storage electrode 133b connects the first storage electrode 133a with the first storage electrode 133a, which may be at the left side and the right side of the first subpixel electrode 191a, respectively.

The first storage electrode 133a may partially overlap one of the left side or the right side of the first subpixel electrode 191a. The second storage electrode 133b is connected to the first storage electrode 133a formed at any one side.

The third storage electrode 133c protrudes from the second storage electrode line 131b, partially overlapping the left and right sides of the second subpixel electrode 191b.

The fourth storage electrode 133d protrudes from the third storage electrode line 131c, overlapping the left and right sides of the third subpixel electrode 191c.

Alternatively, the third storage electrode 133c and the fourth storage electrode 133d may respectively partially overlap only one of the left and right sides of the second subpixel electrode 191b and third subpixel electrode 191c.

Further, the shape and arrangement of the storage electrode lines (first storage electrode line 131a, second storage electrode line 131b, and third storage electrode line 131c) and the storage electrodes (first storage electrode 133a, second storage electrode 133b, third storage electrode 133c, and fourth storage electrode 133d) may be modified in various ways.

The data voltage applied to the data line 171 may continuously change with time, which influences the voltage of the first subpixel electrode 191a, the second subpixel electrode 191b, and the third subpixel electrode 191c. The first storage electrode 133a, the third storage electrode 133c, and the fourth storage electrode 133d may partially overlap the subpixel electrodes (first subpixel electrode 191a, second subpixel electrode 191b, and third subpixel electrode 191c,) adjacent to the data line, such that they can avoid the influence of the voltage.

In an example, an alignment layer may be formed on the first substrate and the second substrate of the liquid crystal layer, and it may be possible to align light in order to control the alignment direction and the alignment angle of the liquid crystal by radiating light to the alignment layers. Although it may be possible to increase the aperture ratio and improve the response speed of the liquid crystal by means of the light alignment, the alignment directions of the liquid crystal may be different at the interfaces of difference domains, such that texture may be generated at the interfaces.

The portion indicated by B in FIG. 5 is the region where the texture is generated, in which luminance may be larger than the other regions. However, it may be possible to reduce the influence caused by the generation of texture. In an example, if the liquid crystal is disposed at an angle of 0 degree at the longitudinal line portion crossing the center of the subpixel electrodes (first subpixel electrode 191a, the second subpixel electrode 191b, and third subpixel electrode 191c), the longitudinal line portion may be shown as if a luminance difference from the other regions is not large, if seen from the sides and the front. On the contrary, if the liquid crystal is disposed at an angle of 90 degrees at the transverse line portion crossing the centers of the subpixel electrodes (first subpixel electrode 191a, the second subpixel electrode 191b, and the third subpixel electrode 191c), the transverse line portion may be shown as if a luminance difference from the other regions is large, if seen from the sides.

Therefore, it may possible to reduce an influence of voltage due to texture by forming the second storage electrode 133b, the second storage electrode lines 131b to cover the transverse line portion crossing the centers of the subpixel electrodes (first subpixel electrode 191a, second subpixel electrode 191b, and third subpixel electrode 191c).

Unlike the first exemplary embodiment, a light blocking member corresponding to the third pixel electrode 191c is not formed on the second substrate, in the second exemplary embodiment. That is, the third subpixel electrode 191c may reduce the voltage of the second subpixel electrode 191b, as well as display an image by transmitting light.

In the second exemplary embodiment, the voltages of the second subpixel electrode 191b and the third subpixel electrode 191c may be similar or near identical, while the voltage of the first subpixel electrode 191a may be larger than the voltage of the second subpixel electrode 191b and the third subpixel electrode 191c. That is, although one pixel is divided in three subpixels, two subpixels may have the similar or near identical voltage, such that two grays may be implemented. In this configuration, the side visibility is further improved by applying three different voltages to the three subpixels, and a voltage difference in the second subpixel electrode 191b and the third subpixel electrode 191c is described hereafter with reference to the third exemplary embodiment.

A liquid crystal display according to the third exemplary embodiment of the invention is described hereafter in detail with reference to FIG. 6, FIG. 7, FIG. 8, and FIG. 9.

Figure 6:
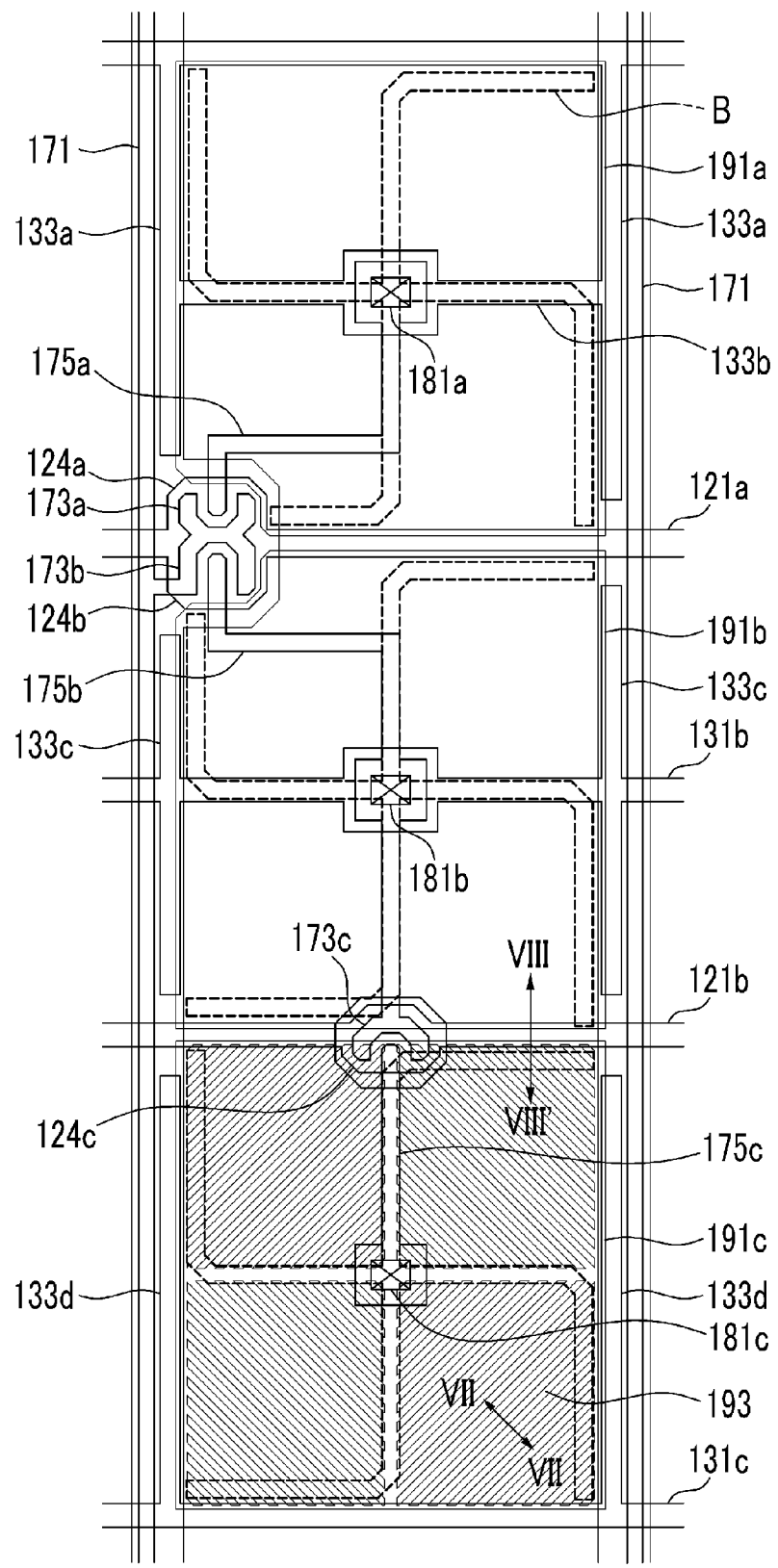
FIG. 6 is a layout view of a lower display panel of a liquid crystal display according to an exemplary embodiment of the invention.
Figure 7:
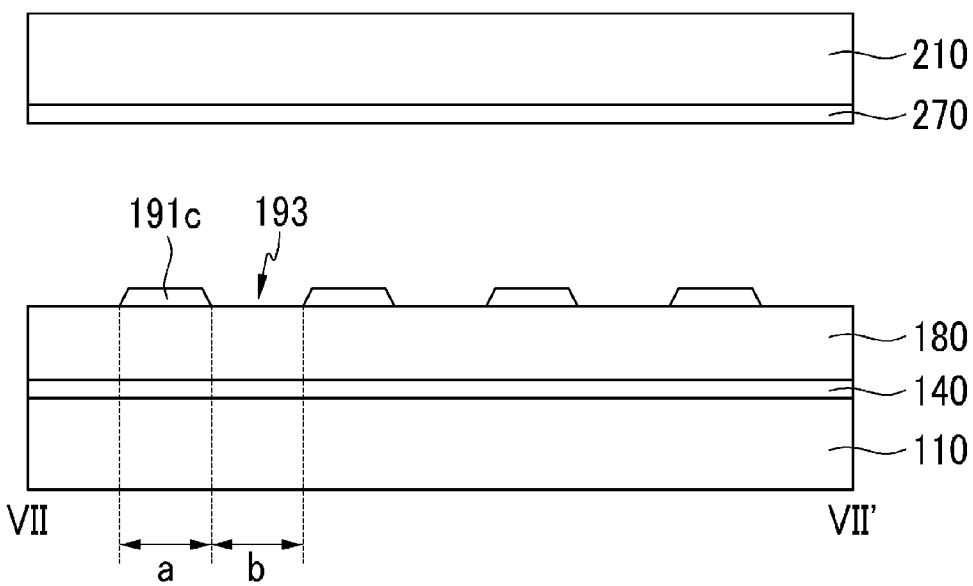
FIG. 7 is a cross-sectional view of the liquid crystal display according to an exemplary embodiment of the invention, taken along the line VII-VII' of FIG. 6.
Figure 8:
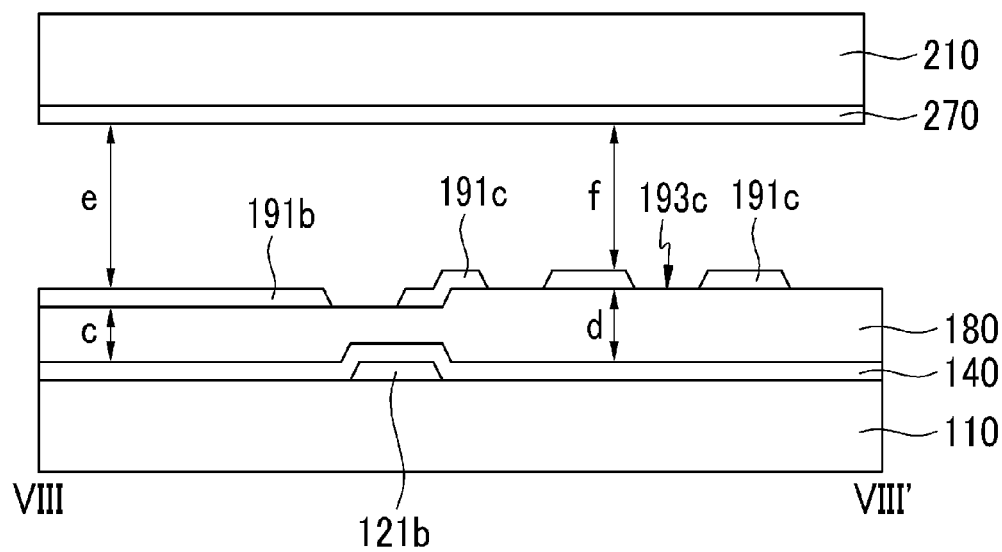
FIG. 8 is a cross-sectional view of the liquid crystal display according to an exemplary embodiment of the invention, taken along the line VIII-VIII' of FIG. 6.
Figure 9:
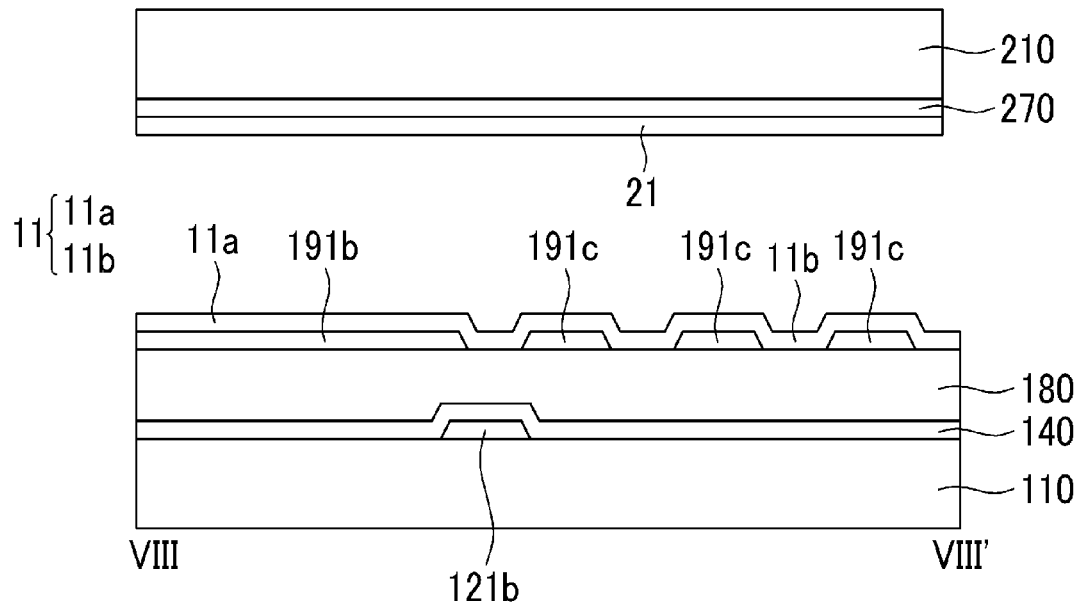
FIG. 9 is a cross-sectional view of a liquid crystal display according to a modification of an exemplary embodiment of the invention, taken along the line VIII-VIII' of FIG. 6.

FIG. 6 is a layout view of a lower display panel of a liquid crystal display according to an exemplary embodiment of the invention. FIG. 7 is a cross-sectional view of the liquid crystal display according an exemplary embodiment of the invention, taken along the line VII-VII' of FIG. 6. FIG. 8 is a cross-sectional view of the liquid crystal display according to an exemplary embodiment of the invention, taken along the line VIII-VIII' of FIG. 6. FIG. 9 is a cross-sectional view of a liquid crystal display according to a modification of an exemplary embodiment of the invention, taken along the line VIII-VIII' of FIG. 6.

A large portion of the configuration of the liquid crystal display according the third exemplary embodiment of the invention is similar to the liquid crystal display according to the second exemplary embodiment, as shown in FIG. 6. Therefore, the detailed description is not provided and discussion will be directed towards the differences.

In the liquid crystal display according to the third exemplary embodiment of the invention, a first subpixel electrode 191a and a second subpixel electrode 191b may be formed in the same way as in the liquid crystal display according to the second exemplary embodiment. One or more fine slits 193 may be provided in the third subpixel electrode 191c. It is possible to make the voltage of the third subpixel electrode 191c lower than the voltage of the second subpixel electrode 191b by providing the fine slits 193.

As shown in FIG. 7, a gate insulating layer 140 and a passivation layer 180 are sequentially stacked on the first substrate 110 and the third subpixel electrode 191c is formed on the passivation layer 180. A common electrode 270 is formed on the second substrate 210 opposite to the first substrate 110.

The fine slits 193 may be provided at regular intervals with various widths. In an example, the width 'a' of a strip of the third subpixel electrode 191c between adjacent fine slits 193 may have a width range of 1 μm to 4 μm. Further, the width 'b' of the fine slit 193 may be in the range of 1 μm to 5 μm.

Further, as shown in FIG. 8, the thickness 'd' of the passivation layer 180 under the third subpixel electrode 191c may be larger than the thickness 'c' of the passivation layer under the first subpixel electrode 191a and the second subpixel electrode 191b. (Please note that only the second subpixel electrode 191b is illustrated in FIG. 8, since the structure around the first subpixel electrode 191a is the same as that around the second subpixel electrode 191b.) That is, it may be possible to form the passivation layers 180 to have different thicknesses in accordance with the positions. In an example, the thickness may be adjusted by using a slit mask of a halftone mask in the process of forming the passivation layers 180, even without using an additional mask.

It may be possible to further increase the difference in voltage between the third subpixel electrode 191c and the second subpixel electrode 191b by making the thickness of the passivation layer 180 irregular such that the cell gap between the first substrate 110 and the second substrate 210 is different in accordance with their positions, as described above. In this configuration, the cell gap 'f' at the portion where the third subpixel electrode 191c is formed may be smaller at 0.1 μm to 0.5 μm than the cell gap 'e' at the portion where the second subpixel electrode 191b is formed.

As shown in FIG. 9, alignment layers 11a and 21 may be formed on the first substrate 110 and the second substrates 210 of the liquid crystal display according to the third exemplary embodiment of the invention. Also, it may be possible to align light in order to control the alignment direction and the alignment angle of the liquid crystal by radiating light to the alignment layer.

The pretilt angle of the alignment layer 11b at the portion corresponding to the third subpixel electrode 191c may be smaller than the pretilt angle of the alignment layer 11a at the portion corresponding to the second subpixel electrode 191b. This difference in pretilt angles may allow further increases in the voltage difference between the third subpixel electrode 191c and the second subpixel electrode 191b. In an example, the pretilt angle of the alignment layer 11b at the portion corresponding to the third subpixel electrode 191c may be smaller at 0.5 is degrees to 2 degrees than the pretilt angle of the alignment layer 11a at the portion corresponding to the second subpixel electrode 191b.

In the liquid crystal display according to the third exemplary embodiment, a method of providing the fine slits 193 in the third subpixel electrode 191c, a method of making the cell gap different by adjusting the height of the passivation layers 180 to be different, and a method of providing the pretilt angle different in light alignment has been described in order to making a difference in voltage between the second subpixel electrode 191b and the third subpixel electrode 191c. One of the three methods may be used alone or in conjunction with the one or two of the other described methods.

In the liquid crystal display according to the third exemplary embodiment, three grays may be implemented by making a difference in voltage between the second subpixel electrode 191b and the third subpixel electrode 191c such that the subpixel electrodes (first subpixel electrode 191a, the second subpixel electrode 191b, and the third subpixel electrodes 191c) have different voltages. As a result, the side visibility can be more improved over the second embodiment having one pixel shown in two grays, if one pixel is shown with three grays, as in the third exemplary embodiment.

Figure 10:
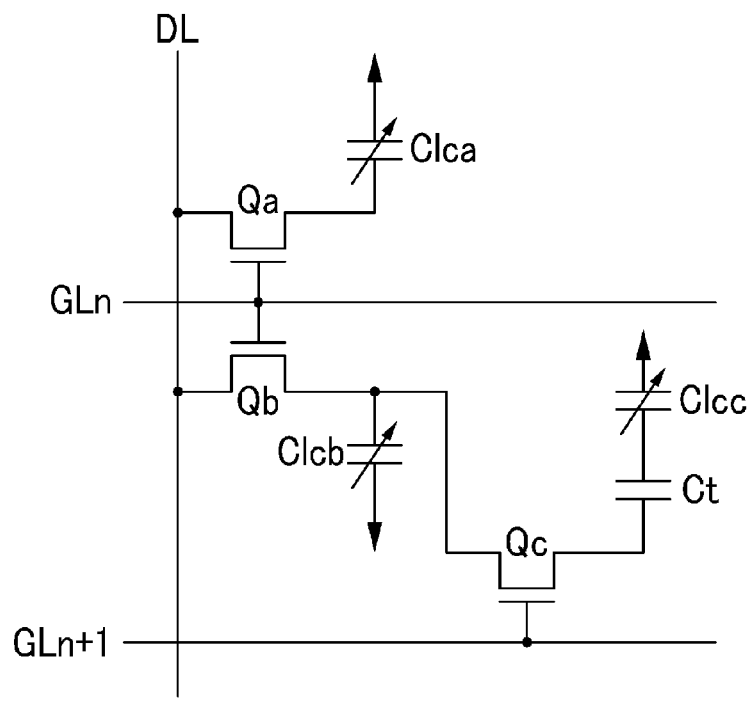
FIG. 10 is an equivalent circuit diagram of one pixel of a liquid crystal display according to an exemplary embodiment of the invention.
Figure 11:
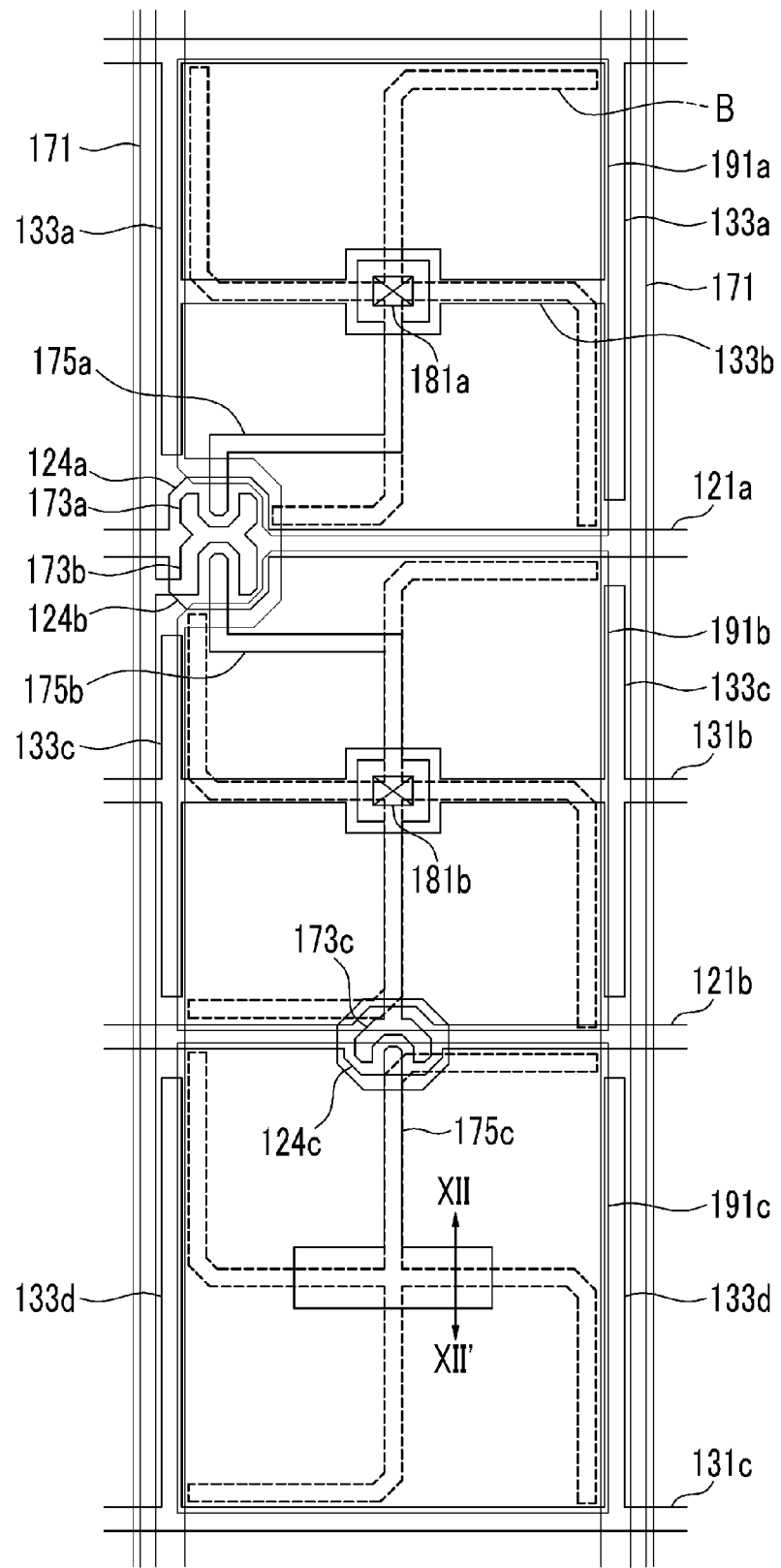
FIG. 11 is a layout view of a lower display panel of the liquid crystal display according to an exemplary embodiment of the invention.
Figure 12:
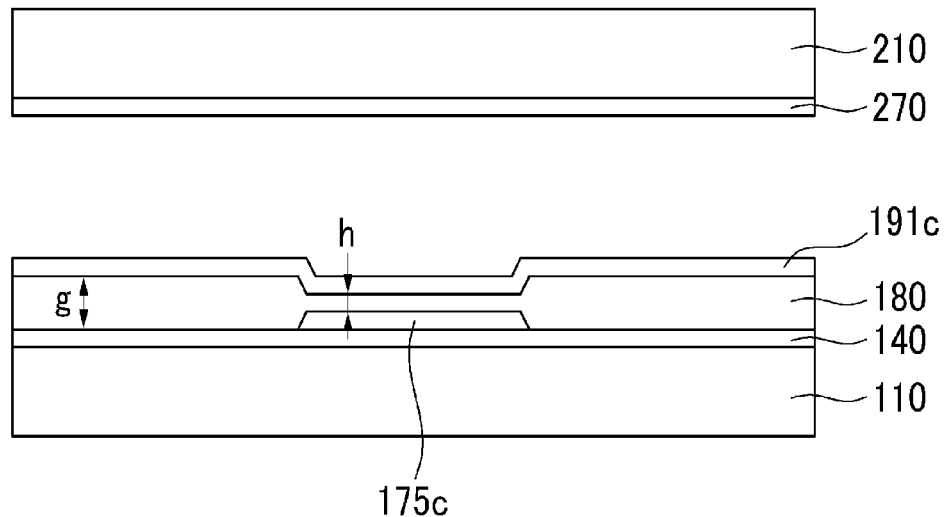
FIG. 12 is a cross-sectional view of a liquid crystal display according to an exemplary embodiment of the invention, taken along the line XII-XII' of FIG. 11.

A liquid crystal display according to a fourth exemplary embodiment of the invention is described hereafter in detail with FIG. 10, FIG. 11, and FIG. 12.

FIG. 10 is an equivalent circuit diagram of one pixel of a liquid crystal display according to an exemplary embodiment of the invention. FIG. 11 is a layout view of a lower display panel of the liquid crystal display according to an exemplary embodiment of the invention. FIG. 12 is a cross-sectional view of the liquid crystal display according to an exemplary embodiment of the invention, taken along the line XII-XII' of FIG. 11.

A large portion of the configuration of the liquid crystal display according the fourth exemplary embodiment of the invention is similar to the liquid crystal display according to the second exemplary embodiment, as shown in FIG. 10. Therefore, the detailed description is not provided and the discussion will be directed towards the differences.

In the liquid crystal display according to the fourth exemplary embodiment of the invention, the third liquid crystal capacitor Clcc is not directly connected to the third switching element Qc, but connected through a transforming capacitor Ct. That is, the liquid crystal display according to the fourth exemplary embodiment may further include the transforming capacitor Ct, as compared with the liquid crystal display according to the second exemplary embodiment. The transforming capacitor Ct is connected to the third switching element Qc and the third liquid crystal capacitor Clcc is connected to the transforming capacitor Ct.

If gate-on voltage is applied to the first gate line GLn, the first switching element Qa and the second switching element Qb are turned on. Also, the same data signal is applied through the data line DL, such that the first liquid crystal capacitor Clca and the second liquid crystal capacitor Clcb are charged with similar or near identical voltage. Thereafter, if gate-on voltage is applied to the second gate line GLn+1, which is the next gate line, the third switching element Qc is turned on and some of the charged voltage of the second liquid crystal capacitor Clcb are discharged to the transforming capacitor Ct and the third liquid crystal capacitor Clcc. Therefore, a difference in voltage is created between the first liquid crystal capacitor Clca and the second liquid crystal capacitor Clcb. Further, the voltage discharged from the second liquid crystal capacitor Clcb may be divided to the transforming capacitor Ct and the third liquid crystal capacitor Clcc, such that a difference in voltage is created between the second liquid crystal capacitor Clcb and the third liquid crystal capacitor Clcc. Accordingly, it may be possible to improve the side visibility of the liquid crystal display.

The structure of the liquid crystal display according to the fourth exemplary embodiment of the invention, as shown in FIG. 11, has a large portion similar to the configuration of the liquid crystal display according to the second exemplary embodiment. Therefore, the detailed description is not provided and the discussion will be directed towards the differences.

In the liquid crystal display according to the fourth exemplary embodiment of the invention, unlike the second exemplary embodiment, the third subpixel electrode 191c is not directly connected to the third drain electrode 175c.

As shown in FIG. 12, a gate insulating layer 140 is formed on the first substrate 110 and a third drain electrode 175c is formed on the gate insulating layer 140. A passivation layer 180 is provided between the third drain electrode 175c and the third subpixel electrode 191c to form the transforming capacitor Ct. A common electrode 270 is formed on the second substrate 210 opposite to the first substrate 110. A liquid crystal layer (not shown) is formed between the third subpixel electrode 191c and common electrode 270 to form the third liquid crystal capacitor Clcc.

The third drain electrode 175c may be formed to have a size above a reference level to function as the transforming capacitor Ct. Further, the third drain electrode 175c may generally be an opaque electrode, such that it is possible to reduce the aperture ratio of the third subpixel electrode 191c.

In this configuration, it may be possible to make the thickness 'h' of the passivation layer 180 (at the portion where the third drain electrode 175c and the third subpixel electrode 191c overlap) smaller than the thickness 'g' of the passivation layer 180 (at the portion where the third drain electrode 175c and the third subpixel electrode 191c do not overlap), in order to reduce the size of the third drain electrode 175c and increase the capacitance of the transforming capacitor Ct. That is, it may be possible to form the passivation layer 180 to have irregular thickness in accordance with their positions by using a slit mask or a halftone mask in the process of forming the passivation layer 180, even without using an additional mask.

In the liquid crystal display according to the fourth exemplary embodiment, the side visibility may be improved by creating a difference in voltage levels between the second subpixel electrode 191b and the third subpixel electrode 191c. Such a difference in voltage levels may be provided using the transforming capacitor (Ct in FIG. 11) such that the first subpixel electrode 191a, the second subpixel electrode 191b, and the third subpixel electrode 191c have different voltages. As a result, three shades of grays may be implemented.

Figure 13:
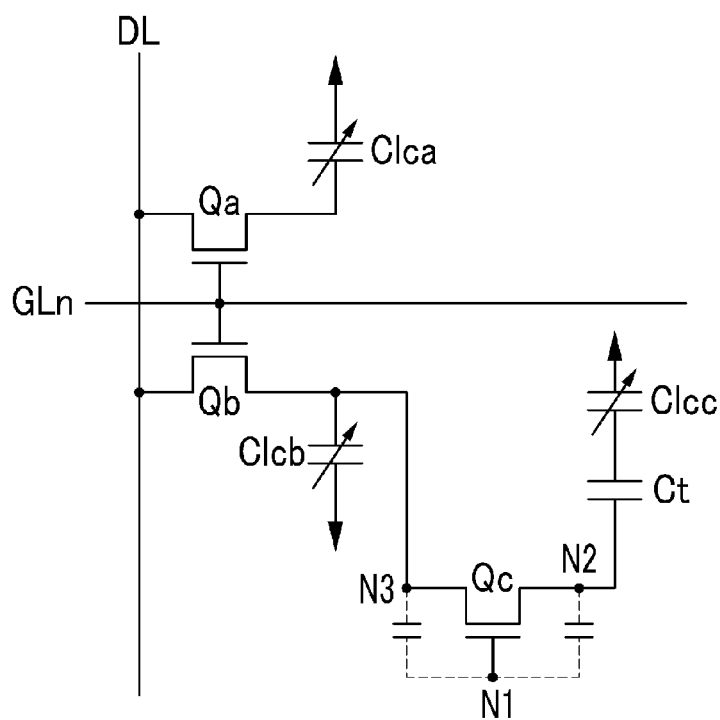
FIG. 13 is an equivalent circuit diagram of one pixel a liquid crystal display according to an exemplary embodiment of the invention.
Figure 14:
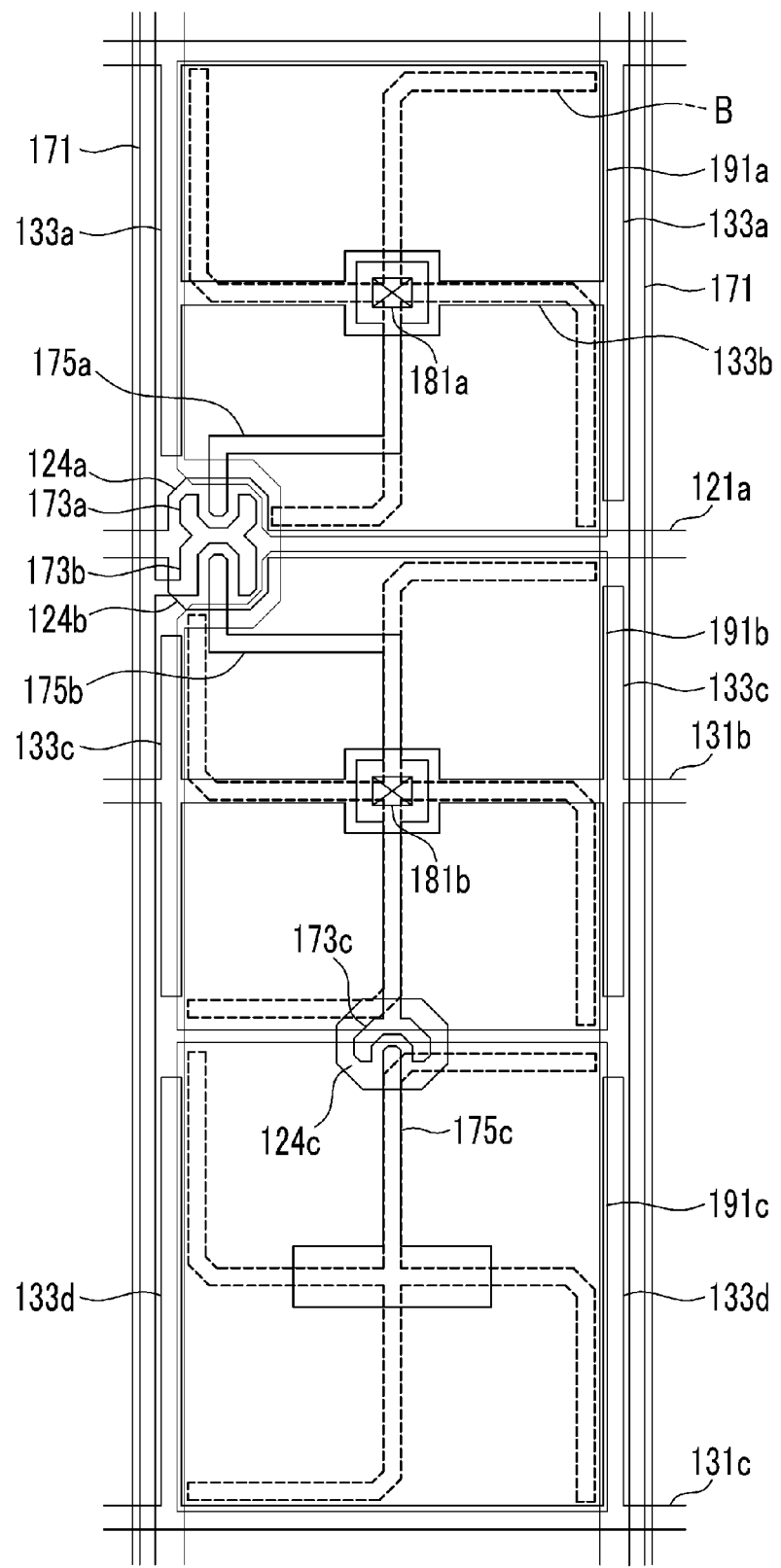
FIG. 14 is a layout view of a lower display panel of the liquid crystal display according to an exemplary embodiment of the invention.

A liquid crystal display according to a fifth exemplary embodiment of the invention is described hereafter in detail with FIG. 13 and FIG. 14.

FIG. 13 is an equivalent circuit diagram of one pixel a liquid crystal display according to an exemplary embodiment of the invention. FIG. 14 is a layout view of a lower display panel of the liquid crystal display according to an exemplary embodiment of the invention.

A large portion of the configuration of the liquid crystal display according the fifth exemplary embodiment of the invention is similar to the liquid crystal display according to the fourth exemplary embodiment, as shown in FIG. 13. Therefore, the detailed description is not provided and discussion will be directed towards the differences.

In the liquid crystal display according to the fifth exemplary embodiment of the invention, unlike the liquid crystal display according to the fourth exemplary embodiment, the second gate line is not provided but the first gate line GLn is provided and connected to a first switching element Qa and a second switching element Qb. The first gate line GLn and the second gate line are not discriminated, such that the first gate line GLn will be described as a gate line in the claim(s) relating to the fifth exemplary embodiment.

As shown in FIG. 13, the third switching element Qc is not connected to a specific gate line, a control terminal N1 is floated, an input terminal N3 is connected to the second switching element Qb, and an output terminal N2 is connected to the transforming capacitor Ct. Further, the transforming capacitor Ct is connected to the third liquid crystal capacitor Clcc.

If gate-on voltage is applied to the first gate line GLn, the first switching element Qa and the second switching element Qb connected thereto are turned on. Further, the same data signal may be applied through the data line DL, such that the first liquid crystal capacitor Clca and the second liquid crystal capacitor Clcb are charged with similar or near identical voltages.

As positive data voltage is applied through the data line DL, the voltage of the control terminal N1 may increase while the input terminal N3 of the third switching element Qc is charged with positive data voltage. Accordingly, current flows from the input terminal N3 to the output terminal N2 of the third switching element Qc and the voltage of the output terminal N2 correspondingly may increase.

If gate-off voltage is applied to the first gate line GLn, the current continues flowing from the input terminal N3 to the output terminal N2, until the voltage of the output terminal N2, the voltage of the input terminal N3, and the voltage of the control terminal N1 become the similar or near identical in the third switching element Qc. Accordingly, the voltage of the input terminal N3 may decrease and the voltage of the output terminal N2 may increase. As a result, the voltage of the second liquid crystal capacitor Clcb connected to the input terminal N3 of the third switching element Qc decreases under the positive data voltage that has been applied, such that it decreases under the voltage of the first liquid crystal capacitor Clca. Further, the voltage discharged from the second liquid crystal capacitor Clcb is divided to the transforming capacitor Ct and the third liquid crystal capacitor Clcc, such that a difference in voltage is generated between the second liquid crystal capacitor Clcb and the third liquid crystal capacitor Clcc. Accordingly, it may be possible to improve the side visibility of the liquid crystal display.

The structure of the liquid crystal display according to the fifth exemplary embodiment of the invention, as shown in FIG. 14, has a large portion similar to the configuration of the liquid crystal display according to the fourth exemplary embodiment; therefore, the detailed description is not provided and discussion will be directed towards the differences.

In the liquid crystal display according to the fifth exemplary embodiment of the invention, unlike the fourth exemplary embodiment, the second gate line is not specifically provided and but the first gate line 121a is provided.

The third gate electrode 124c is floated between the second subpixel electrode 191b and the third subpixel electrode 191c, without being connected to a specific gate line.

Further, similar to the fourth exemplary embodiment, it is possible to make the thickness of the passivation layer 180 at the portion where the third drain electrode 175c and the third subpixel electrode 191c overlap smaller than the other portions.

In the liquid crystal display according to the fifth exemplary embodiment, it may be possible to improve the side visibility by making a difference in voltage between the second subpixel electrode 191b and the third subpixel electrode 191c. Such a difference may be created using the third switching element (Qc in FIG. 13) with the control terminal floating and the transforming capacitor (Ct in FIG. 13) such that the subpixel electrodes (first subpixel electrode 191a, second subpixel electrode 191b, and third subpixel electrode 191c) have different voltages and three grays are implemented as a result.

Figure 15:
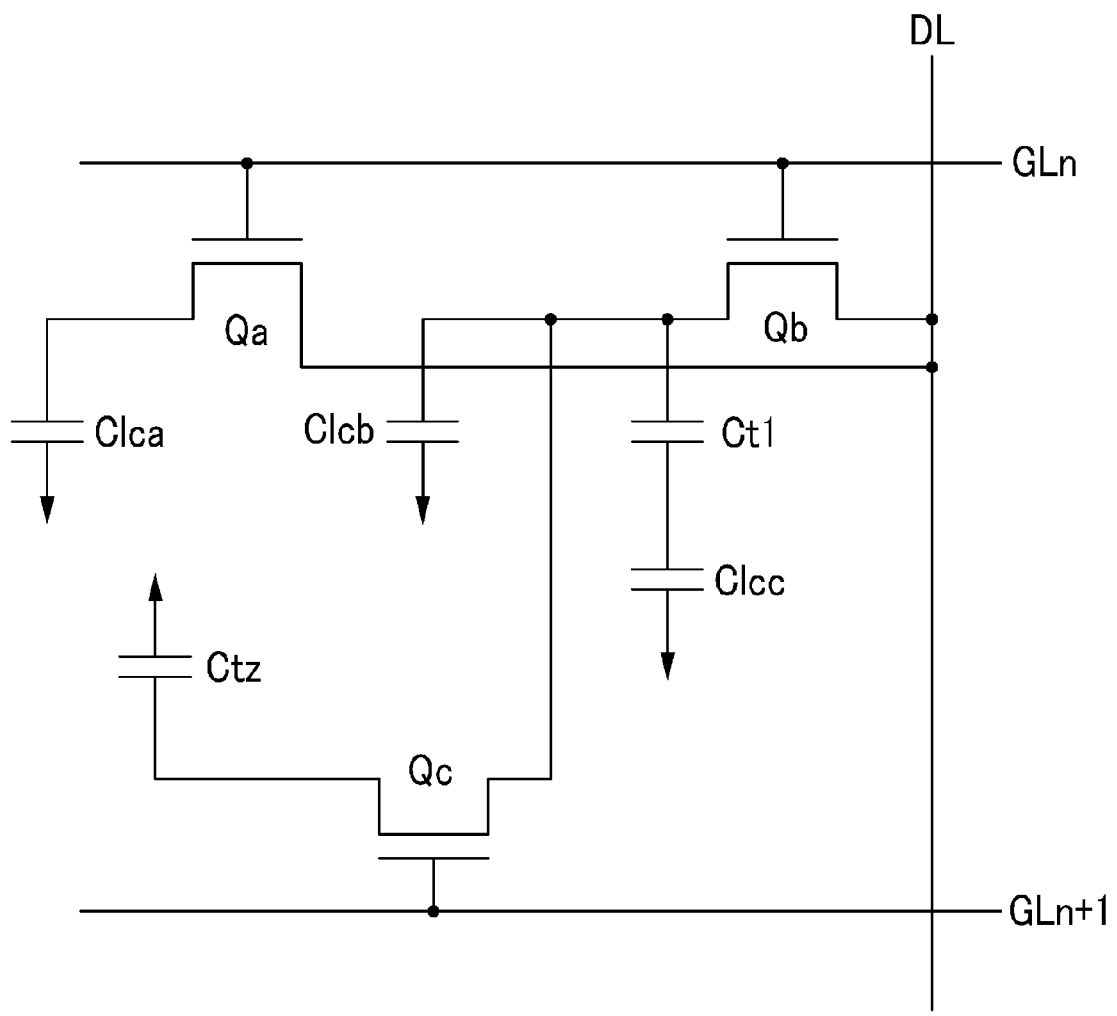
FIG. 15 is an equivalent circuit diagram of one pixel a liquid crystal display according to an exemplary embodiment of the invention.

A liquid crystal display according to a sixth exemplary embodiment of the invention is described hereafter in detail with reference to FIG. 15.

FIG. 15 is an equivalent circuit diagram of one pixel a liquid crystal display according to an exemplary embodiment of the invention.

A liquid crystal display according to the sixth exemplary embodiment of the invention, as shown in FIG. 15, includes a first switching element Qa and a second switching element Qb, a first liquid crystal capacitor Clca connected to the first switching element Qa, a second liquid crystal capacitor Clcb and a third liquid crystal capacitor Clcc connected to the second switching element Qb, and a third switching element Qc connected to the second switching element Qb.

Further, a first transforming capacitor Ct1 may be further formed between the second switching element Qb and the third liquid crystal capacitor Clcc. Also, a second transforming capacitor Ctz connected to the third switching element may be further formed.

The liquid crystal display according to the sixth exemplary embodiment of the invention further includes a first gate line GLn, a second gate line GLn+1, and a data line DL. The first switching element Qa and the second switching element Qb may be three terminal elements of a thin film transistor etc., connected to the first gate line GLn to be switched by the same signal, and connected to the data line DL to receive the same data signal. The third switching element Qc may be a three terminal element of a thin film transistor etc., and connected to the second gate line GLn+1.

If gate-on voltage is applied to the first gate line (GLn), the first switching element Qa and the second switching element Qb are turned on and the same data signal is applied through the data line DL, such that the first liquid crystal capacitor Clca and the second liquid crystal capacitor Clcb are charged with the similar or near identical voltage. The third liquid crystal capacitor Clcc is charged with voltage lower than the first liquid crystal capacitor Clca and second liquid crystal capacitor Clcb, due to the first transforming capacitor Ct1.

Thereafter, if gate-on voltage is applied to the second gate line GLn+1, which is the next gate line, the third switching element Qc is turned on and some of the charged voltage of the second liquid crystal capacitors Clcb and third liquid crystal capacitor Clcc is discharged to the second transforming capacitor Ctz. Therefore, the voltage of the second liquid crystal capacitor Clcb decreases under the voltage of the first liquid crystal capacitor Clca and the voltage of the third liquid crystal capacitor Clcc decreases under the voltage of the second liquid crystal capacitor Clcb. Accordingly, it may be possible to improve the side visibility of the liquid crystal display.

Although the structure of the liquid crystal display according to the sixth exemplary embodiment of the invention is not shown, it may include a first substrate, one or more first gate lines and second gate lines and one or more data lines formed on the first substrate, a first switching element and a second switching element connected to the first gate line and the data line, a first subpixel electrode connected to the first switching element, a second subpixel electrode and a third subpixel electrode connected to the second switching element, a first transforming capacitor formed between the second switching element and the third subpixel electrode, a third switching element connected to the second switching element and switched by the second gate line, and a second transforming capacitor connected to the third switching element.

Further, it may further include a second substrate opposite to the first substrate, a common electrode formed on the second substrate, and a liquid crystal layer formed between the first substrate and the second substrate.

In the liquid crystal displays according to the third to sixth exemplary embodiments of the invention, the first subpixel electrode 191a, the second subpixel electrode 191b, and the third subpixel electrode 191c have different voltages and three grays may be implemented as a result, thereby improving the side visibility.

Hereinafter, the maximum area ratio and voltage ratio of the subpixel electrodes (first subpixel electrode 191a, second subpixel electrode 191b, and third subpixel electrode 191c) for improving the side visibility of the liquid crystal displays according to the third to sixth exemplary embodiments of the invention are described with reference to FIG. 16, FIG. 17, FIG. 18, and FIG. 19.

Figure 16:
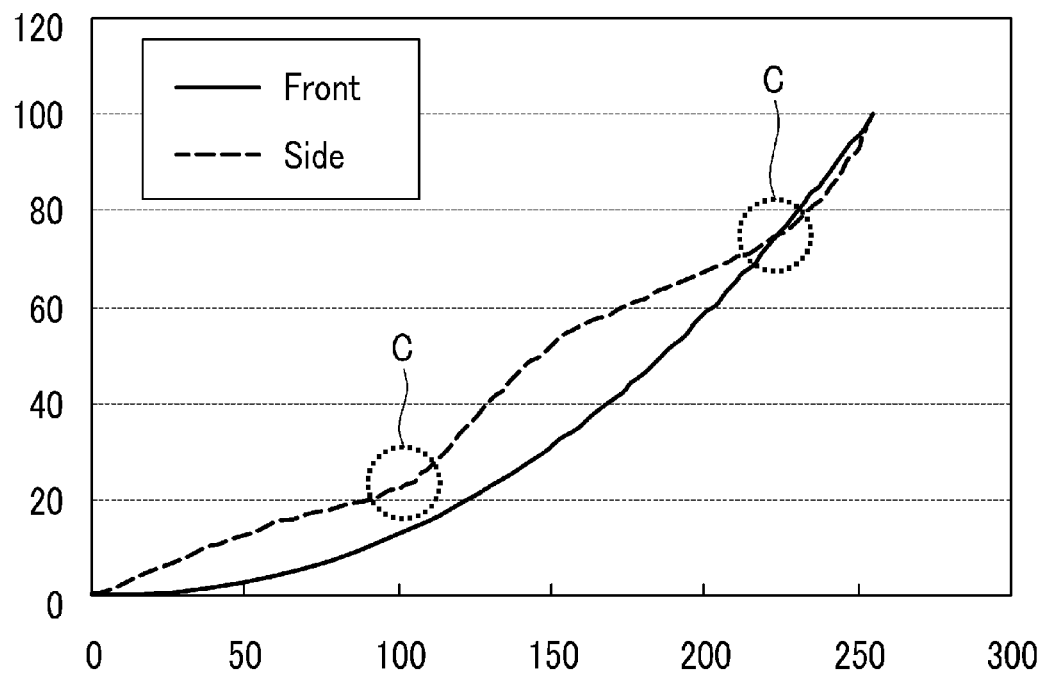
FIG. 16 is a graph showing a V-T curve at the front and the side of a liquid crystal display according to the related art.
Figure 17:
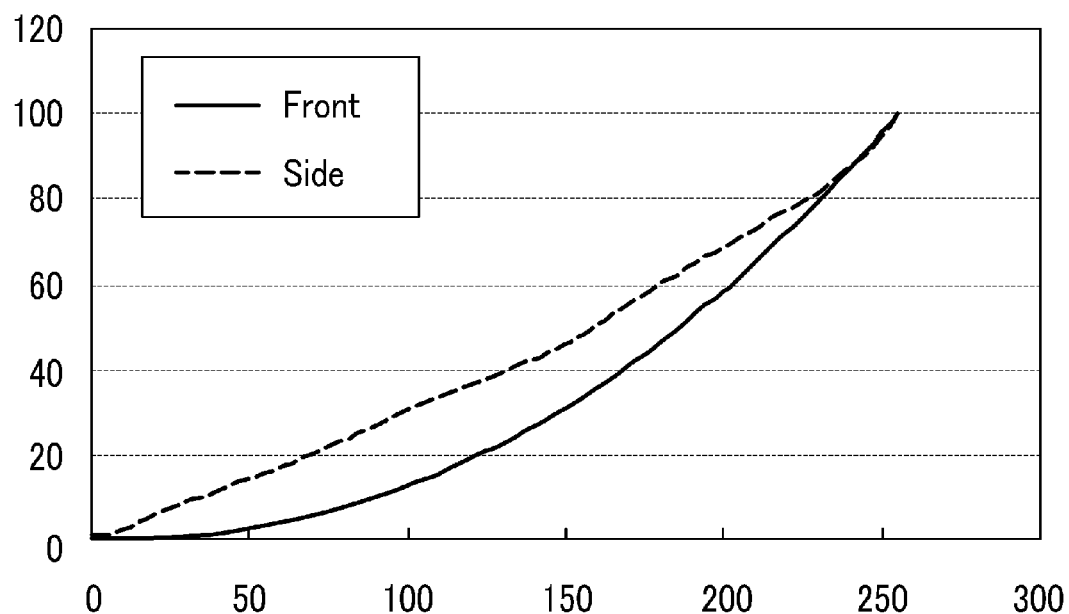
FIG. 17 is a graph showing a V-T curve at the front and the side of a liquid crystal display according to an exemplary embodiment of the invention.
Figure 18:
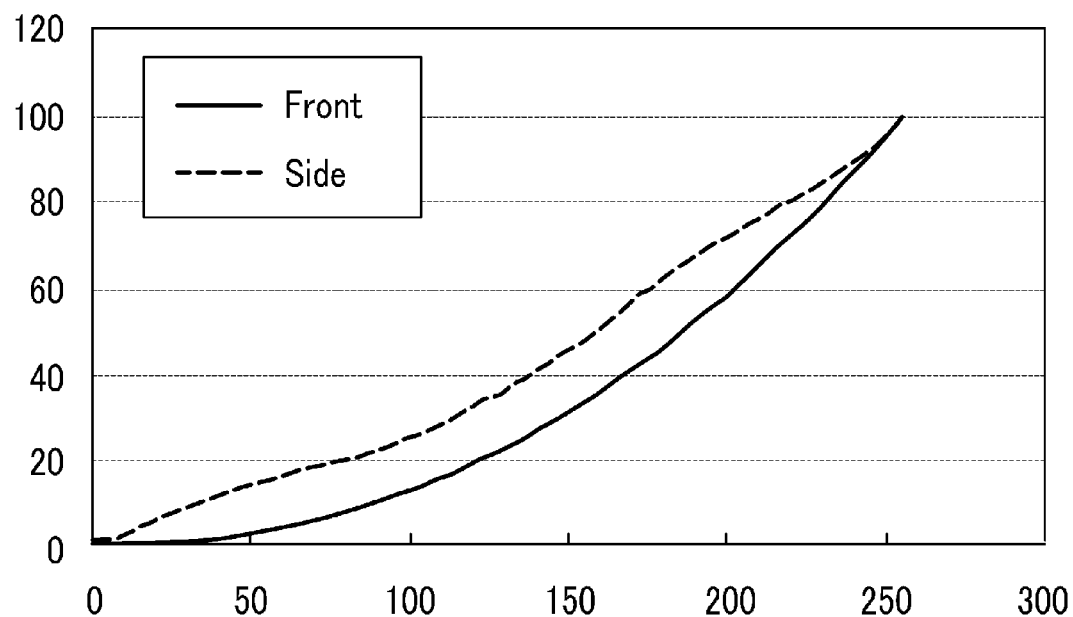
FIG. 18 is a graph showing a V-T curve at the front and the side of a liquid crystal display according to an exemplary embodiment of the invention.
Figure 19:
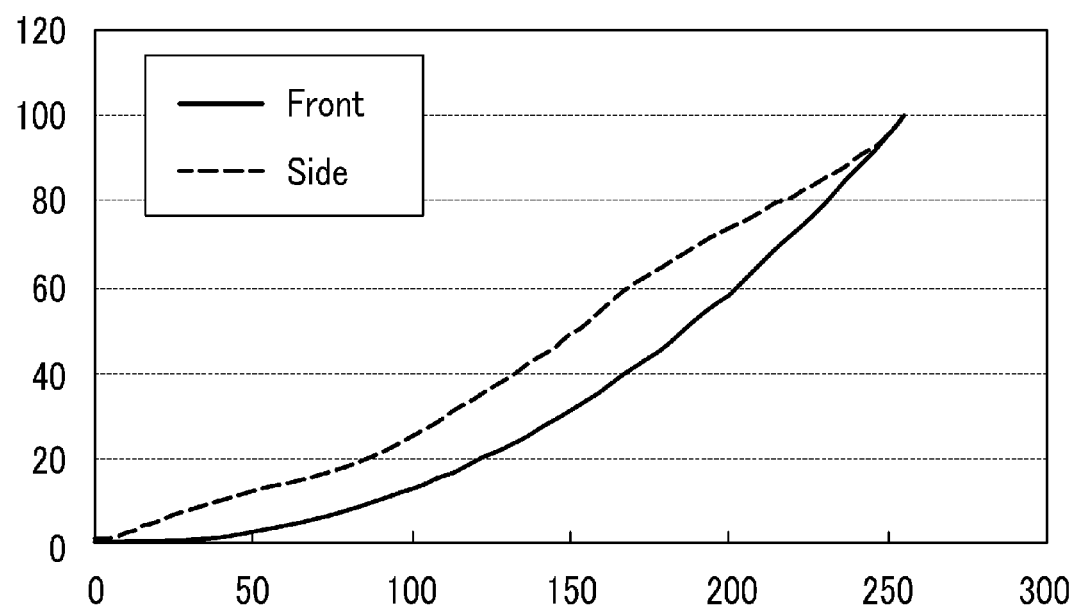
FIG. 19 is a graph showing a V-T curve at the front and the side of a liquid crystal display according to an exemplary embodiment of the invention.

FIG. 16 is a graph showing a V-T curve at the front and the side of a liquid crystal display according to the related art. FIG. 17 is a graph showing a V-T curve at the front and the side of a liquid crystal display according to an exemplary embodiment of the invention. FIG. 18 is a graph showing a V-T curve at the front and the side of a liquid crystal display according to an exemplary embodiment of the invention. FIG. 19 at the front and the side of a liquid crystal display according to an exemplary embodiment of the invention.

In FIG. 16, FIG. 17, FIG. 18 and FIG. 19, the horizontal axis represents data voltage, the vertical axis represents transmittance, the solid line represents the front visibility, and the dotted line represents the side visibility.

A liquid crystal display according to the related art may have a problem in that, as shown in FIG. 16, bumping may be generated at a time when a pixel electrode where voltage showing a low gray is applied is turned on, if the difference between the voltage showing a high gray and the voltage showing a low gray is large in the method of dividing one pixel in two subpixels and applying different voltages thereto.

In the liquid crystal display according to an exemplary embodiment of the invention, as shown in FIG. 17, FIG. 18 and FIG. 19, the section where the bumping period, as shown in FIG. 16, is removed by dividing one pixel in three subpixels with different voltages.

FIG. 17, FIG. 18, and FIG. 19 show several typical experimental examples, in which the voltage ratio of the first subpixel electrode, second subpixel electrode, and third subpixel electrode may be 1:0.6 to 0.85:0.4 to 0.7. Further, the area ratio of the first subpixel electrode, second subpixel electrode, and third subpixel electrode may be 1:1 to 2:1 to 2. While the voltage ratio and the area ratio may not be limited to the exemplary ratios provided, the effect of improving the visibility may be low if the voltage ratio and the area ratio are too small, and a bumping section may be generated if the voltage ratio and the area ratio are too large.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
   a first substrate;
   a first switching element and a second switching element formed on the first substrate and configured to be switched by the same signal;
   a first subpixel electrode connected to the first switching element;
   a second subpixel electrode connected to the second switching element;
   a third switching element connected to the second switching element;
   a third subpixel electrode connected to the third switching element, the third subpixel electrode configured to receive a voltage only when the third switching element is turned on;
   a second substrate;
   a common electrode formed on the second substrate;
   a first gate line, a second gate line, and a data line formed on the first substrate, and
   a liquid crystal layer formed between the first substrate and the second substrate,
   wherein:
   an area ratio of the first subpixel electrode to the second subpixel electrode is 1: 1-2;
   an area ratio of the first subpixel electrode to the third subpixel electrode is 1:1-2;
   the first switching element and the second switching element are connected to the first gate line and the data line; and
   the third switching element is configured to be switched by a signal received from the second gate line.

2. The liquid crystal display of claim 1, wherein the first subpixel electrode, the second subpixel electrode, and the third subpixel electrode are formed directly on the same layer.

3. The liquid crystal display of claim 2, wherein the first subpixel electrode, the second subpixel electrode, and the third subpixel electrode each comprise Indium Tin Oxide (ITO), Indium Zinc Oxide (IZO), or both ITO and IZO.

4. The liquid crystal display of claim 1, wherein the third subpixel electrode is formed between the first subpixel electrode and the second subpixel electrode.

5. The liquid crystal display of claim 4, further comprising:
   a light blocking member that is formed on the second substrate, wherein a position of the light blocking member corresponds to positions of the first gate line, the second gate line, the first switching element, the second switching element, the third switching element, and the third subpixel electrode.

6. The liquid crystal display of claim 1, wherein the second switching element comprises:
   a second gate electrode protruding from the first gate line,
   a second source electrode protruding from the data line and formed on the second gate electrode, and
   a second drain electrode opposite to and spaced apart from the second source electrode; and the third switching element comprises:
a third gate electrode protruding from the second gate line,
a third source electrode connected to the second drain electrode and formed on the third gate electrode, and
a third drain electrode opposite to and spaced apart from the third source electrode.

7. The liquid crystal display of claim 6, wherein the second source electrode and the third source electrode are both U-shaped, and the third source electrode has the same orientation as the second source electrode if the second source electrode is turned counterclockwise at 90 degrees.

8. The liquid crystal display of claim 1, wherein the second subpixel electrode and the third subpixel electrode are disposed on opposite sides of the second gate line from each other.

9. The liquid crystal display of claim 8, further comprising:
a storage electrode line spaced apart from the first gate line and the second gate line;
and a storage electrode protruding from the storage electrode line.

10. The liquid crystal display of claim 9, wherein the storage electrode overlaps the center portions of the first subpixel electrode and the second subpixel electrode.

11. The liquid crystal display of claim 9, wherein the storage electrode line comprises:
a first storage electrode line disposed at an upper portion of the first subpixel electrode;
a second storage electrode line overlapping the center portion of the second subpixel electrode; and
a third storage electrode line disposed at a lower portion of the third subpixel electrode.

12. The liquid crystal display of claim 11, wherein the storage electrode comprises:
a first storage electrode protruding from the first storage electrode line to partially overlap one or both of the left and right sides of the first subpixel electrode; and
a second storage electrode formed in parallel with the first gate line to overlap the center portion of the first subpixel electrode and connected to the first storage electrode.

13. The liquid crystal display of claim 12, wherein the storage electrode further comprises:
a third storage electrode protruding from the second storage electrode line and partially overlapping one or both of the left and right sides of the second subpixel electrode.

14. The liquid crystal display of claim 13, wherein the storage electrode further comprises:
a fourth storage electrode protruding from the third storage electrode line and partially overlapping one or both of the left and right sides of the third subpixel electrode.

15. The liquid crystal display of claim 8, wherein the voltage of the first subpixel electrode is higher than the voltage of the second subpixel electrode, and the third subpixel electrode in response to the third switching element being switched by the signal received from the second gate line.

16. The liquid crystal display of claim 15, wherein the second subpixel electrode and the third subpixel electrode have the same or near identical voltage in response to the third switching element being switched by the signal received from the second gate line.

17. The liquid crystal display of claim 8, wherein, in response to the third switching element being switched by the signal received from the second gate line, the voltage of the first subpixel electrode is higher than the voltage of the second subpixel electrode, and the voltage of the second subpixel electrode is higher than the voltage of the third subpixel electrode.

18. The liquid crystal display of claim 17, wherein a voltage ratio of the first subpixel electrode to the second subpixel electrode is 1:0.6-0.85, and
a voltage ratio of the first subpixel electrode to the third subpixel electrode is 1:0.4-0.7.

19. The liquid crystal display of claim 17, further comprising:
fine slits formed in the third subpixel electrode.

20. The liquid crystal display of claim 19, wherein the width of the third subpixel electrode between adjacent fine slits is in the range of 1 μm to 4 μm.

21. The liquid crystal display of claim 19, wherein the width of the fine slit is in the range of 1 μm to 5 μm.

22. The liquid crystal display of claim 19, further comprising:
an alignment layer comprising a first portion corresponding to the third subpixel electrode and having a first pretilt angle, and a second portion corresponding to the second subpixel electrode and having second pretilt angle, wherein the first pretilt angle is smaller than the second pretilt angle.

23. The liquid crystal display of claim 22, wherein the first pretilt angle is 0.5 to 2 degrees smaller than the second pretilt angle.

24. The liquid crystal display of claim 19, wherein a cell gap between the first substrate and the second substrate is provided such that a width of the cell gap at a portion corresponding to the third subpixel electrode is less than a width of the cell gap at a portion corresponding to the second subpixel electrode.

25. The liquid crystal display of claim 24, further comprising:
a passivation layer formed under the second subpixel electrode and the third subpixel electrode, wherein the thickness of the passivation layer under the third subpixel electrode is larger than the thickness of the passivation layer under the second subpixel electrode.

26. The liquid crystal display of claim 25, wherein the passivation layer is formed by using a slit mask or an halftone mask such that that passivation layer has irregular thickness.

27. The liquid crystal display of claim 24, wherein the cell gap of the portion corresponding to the third subpixel electrode is less than the width of the cell gap by 0.1 μm to 0.5 μm at the portions corresponding to the first subpixel electrode and the second subpixel electrode.

28. The liquid crystal display of claim 19, further comprising:
an alignment layer comprising a first portion corresponding to the third subpixel electrode and having a first pretilt angle, and a second portion corresponding to the second subpixel electrode and having a second pretilt angle, wherein the first pretilt angle is smaller than the second pretilt angle,
wherein the cell gap between the first substrate and the second substrate is provided such that a width of the cell gap at a portion corresponding to the third subpixel electrode is less than a width of the cell gap at a portion corresponding to the second subpixel electrode.

29. The liquid crystal display of claim 17, further comprising:
a transforming capacitor formed between the third switching element and the third subpixel electrode.

30. The liquid crystal display of claim 29, wherein the third switching element further comprises:
a third gate electrode protruding from the second gate line;
a third source electrode connected to the second switching element and formed on the third gate electrode;

a third drain electrode opposite to and spaced apart from the third source electrode and extending to the center of the third subpixel electrode; and a passivation layer formed on the third source electrode and the third drain electrode, wherein the third drain electrode, the passivation layer, and the third subpixel electrode constitute the transforming capacitor.

31. The liquid crystal display of claim 30, wherein the thickness of the passivation layer is smaller at a portion where the third drain electrode, and the third subpixel electrode overlap a portion where the third drain electrode and the third subpixel electrode do not overlap.

32. The liquid crystal display of claim 31, wherein the passivation layer is formed by using a slit mask or an halftone mask to provide the passivation layer with irregular thickness.

33. The liquid crystal display of claim 1, further comprising:
a gate line and a data line formed on the first substrate,
wherein the first switching element and the second switching element are connected to the gate line and the data line, and
the third switching element comprises an input terminal connected to the second switching element and an electrically floated control terminal.

34. The liquid crystal display of claim 33, wherein the voltage of the first subpixel electrode is higher than the voltage of the second subpixel electrode, and the voltage of the second subpixel electrode is higher than the voltage of the third subpixel electrode in response to the first and second switching elements being switched by a signal received from the gate line.

35. The liquid crystal display of claim 34, wherein a voltage ratio of the first subpixel electrode to the second subpixel electrode is 1:0.6-0.85, and
a voltage ratio of the first subpixel electrode to the third subpixel electrode is 1:0.4-0.7.

36. The liquid crystal display of claim 1, wherein a transforming capacitor is formed between the third switching element and the third subpixel electrode, wherein the third switching element comprises:
a third gate electrode that is electrically floated;
a third source electrode connected to the second switching element and formed on the third gate electrode;
a third drain electrode opposite to and spaced apart from the third source electrode and extending to the center of the third subpixel electrode, and a passivation layer formed on the third source electrode and the third drain electrode, wherein the third drain electrode, the passivation layer, and the third subpixel electrode constitute the transforming capacitor.

37. The liquid crystal display of claim 36, wherein the thickness of the passivation layer is smaller at a portion where the third drain electrode and the third subpixel electrode overlap a portion where the third drain electrode and the third subpixel electrode do not overlap.

38. The liquid crystal display of claim 37, wherein the passivation layer is formed by using a slit mask or an halftone mask to provide the passivation layer with a irregular thickness.

39. The liquid crystal display of claim 36, further comprising:
a gate line and a data line formed on the first substrate, wherein the first switching element and the second switching element are connected to the gate line and the data line, wherein the second switching element comprises:
a second gate electrode protruding from the gate line;
a second source electrode protruding from the data line and formed on the second gate electrode; and
a second drain electrode opposite to and spaced apart from the second source electrode, wherein the third source electrode is connected to the second drain electrode.

40. The liquid crystal display of claim 1, wherein:
the first subpixel electrode, the common electrode, and the liquid crystal layer constitute a first liquid crystal capacitor;
the second subpixel electrode, the common electrode, and the liquid crystal layer constitute a second liquid crystal capacitor;
the third subpixel electrode, the common electrode, and the liquid crystal layer constitute a third liquid crystal capacitor; wherein
the third liquid crystal capacitor is configured to reduce a voltage of the second liquid crystal capacitor.

* * * * *